United States Patent
Hirowatari et al.

(10) Patent No.: US 7,011,054 B2
(45) Date of Patent: Mar. 14, 2006

(54) APPARATUS FOR CONTROLLING VALVE ACTUATION IN INTERNAL COMBUSTION ENGINE

(75) Inventors: Seiji Hirowatari, Toyota (JP); Masanao Idogawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/525,872

(22) PCT Filed: Jun. 4, 2004

(86) PCT No.: PCT/JP2004/008185

§ 371 (c)(1),
(2), (4) Date: Feb. 25, 2005

(87) PCT Pub. No.: WO2004/109079

PCT Pub. Date: Dec. 16, 2004

(65) Prior Publication Data

US 2005/0268871 A1 Dec. 8, 2005

(30) Foreign Application Priority Data

Jun. 4, 2003 (JP) .............................. 2003-159171

(51) Int. Cl.
*F01L 1/34* (2006.01)
(52) U.S. Cl. .............................. 123/90.15; 123/90.16; 123/90.17; 701/105
(58) Field of Classification Search ............. 123/90.15; 701/105
See application file for complete search history.

(56) References Cited

U.S. PATENT DOCUMENTS

| 6,109,225 A | 8/2000 | Ogita et al. |
| 6,679,206 B1 | 1/2004 | Takagi |
| 6,820,591 B1 | 11/2004 | Tanei |
| 2001/0042529 A1 | 11/2001 | Kawasaki et al. |
| 2003/0070637 A1 | 4/2003 | Majima |
| 2005/0087158 A1 * | 4/2005 | Tanei ....................... 123/90.15 |

FOREIGN PATENT DOCUMENTS

| DE | 103 18 197 A1 | 11/2003 |
| EP | 0 737 799 A1 | 10/1996 |
| EP | 1 104 844 A2 | 6/2001 |
| JP | 11-218035 | 8/1999 |

\* cited by examiner

*Primary Examiner*—Thomas Denion
*Assistant Examiner*—Kyle M. Riddle
(74) *Attorney, Agent, or Firm*—Kenyon & Kenyon

(57) ABSTRACT

Either associated process control or discrete process control is selected for valve timing control according to the engine operation state. Under the associated process control, the target displacement angle INP of an intake camshaft (22) is computed according to the engine operation state, and the actual displacement angle INR of the camshaft (22) is brought closer to it. Further, based on the target valve overlap amount OVP computed according to the engine operation state and the actual displacement angle INR, the target displacement angle EXP of an exhaust camshaft (23) is computed, and the actual displacement angle EXR of the camshaft (23) is brought closer to it. Under the discrete process control, the target displacement angles INP, EXP are computed according to the engine operation state, and the actual displacement angles INR, EXR are brought closer to them.

7 Claims, 11 Drawing Sheets

Fig.2
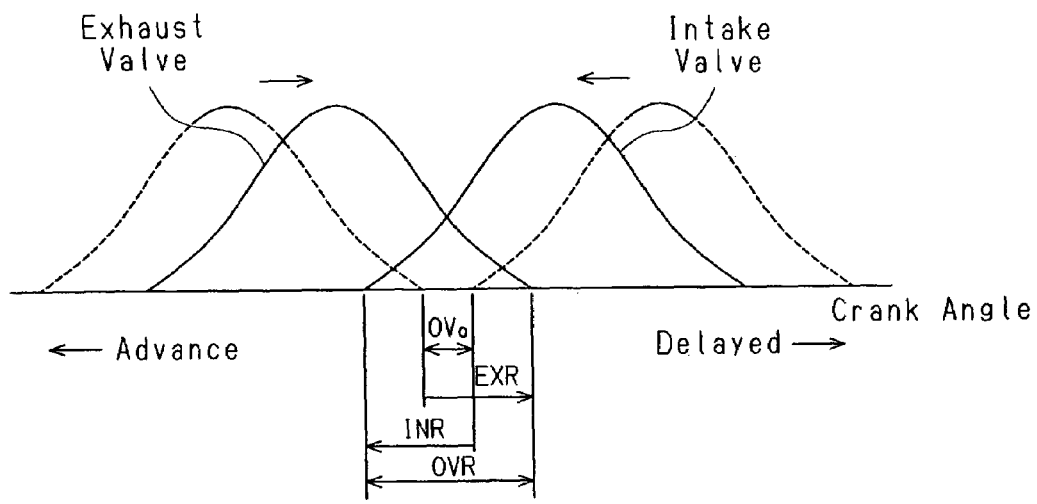
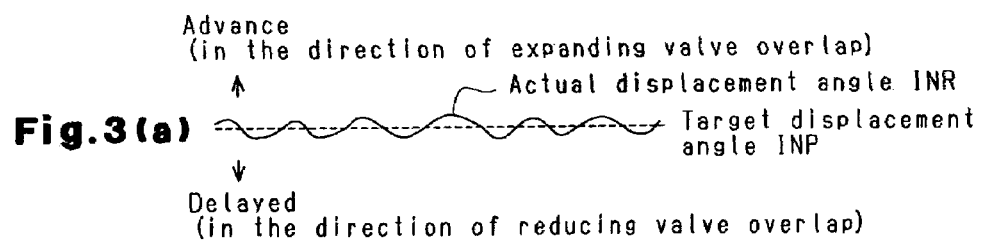
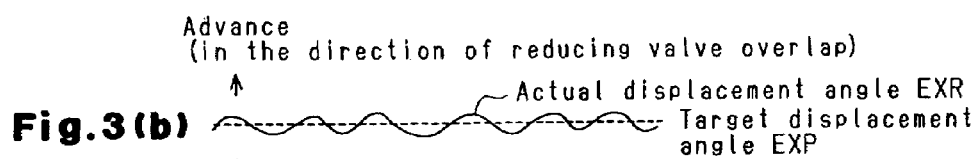
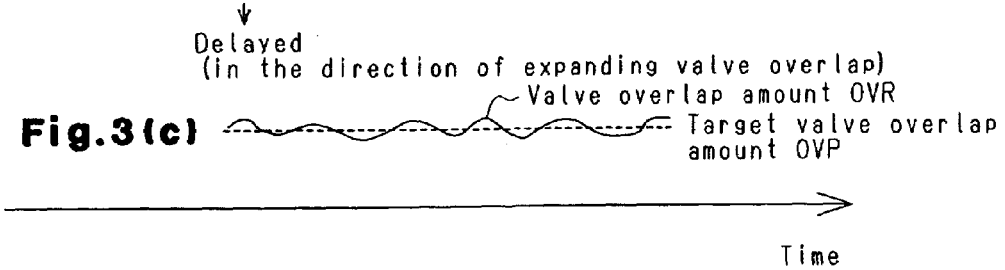

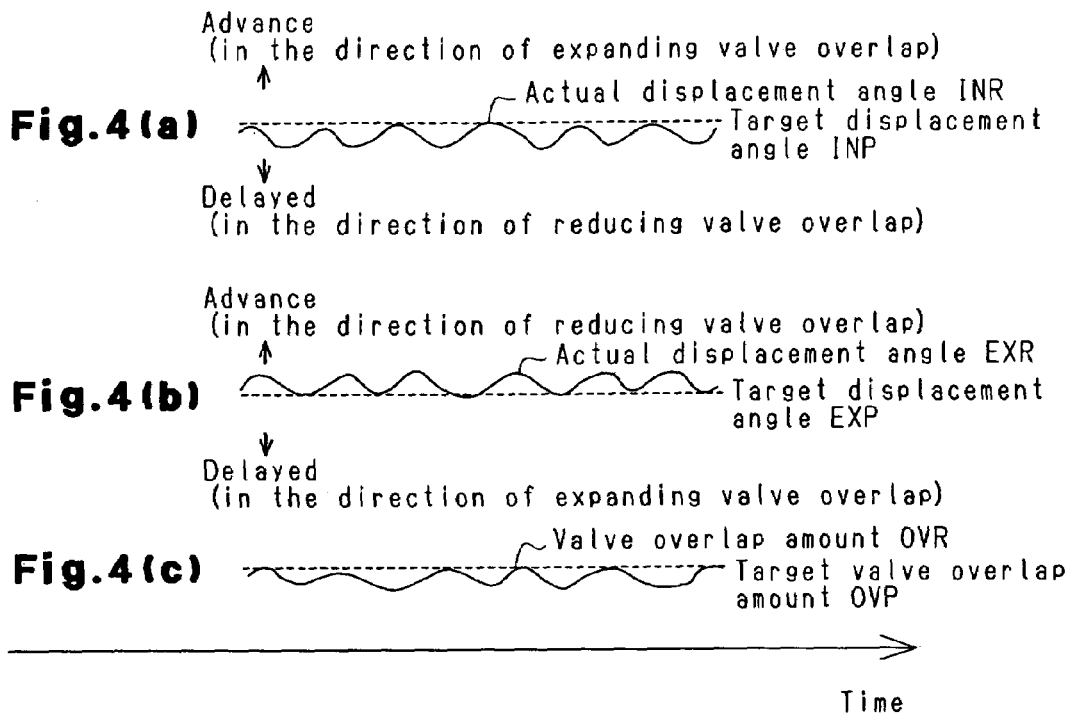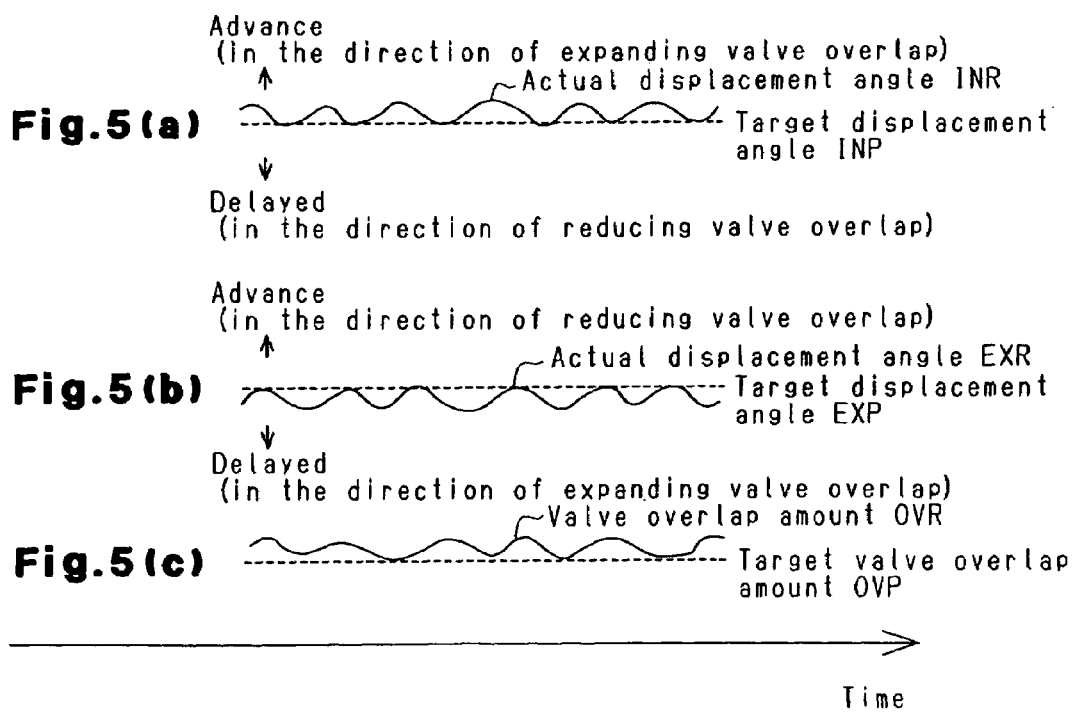

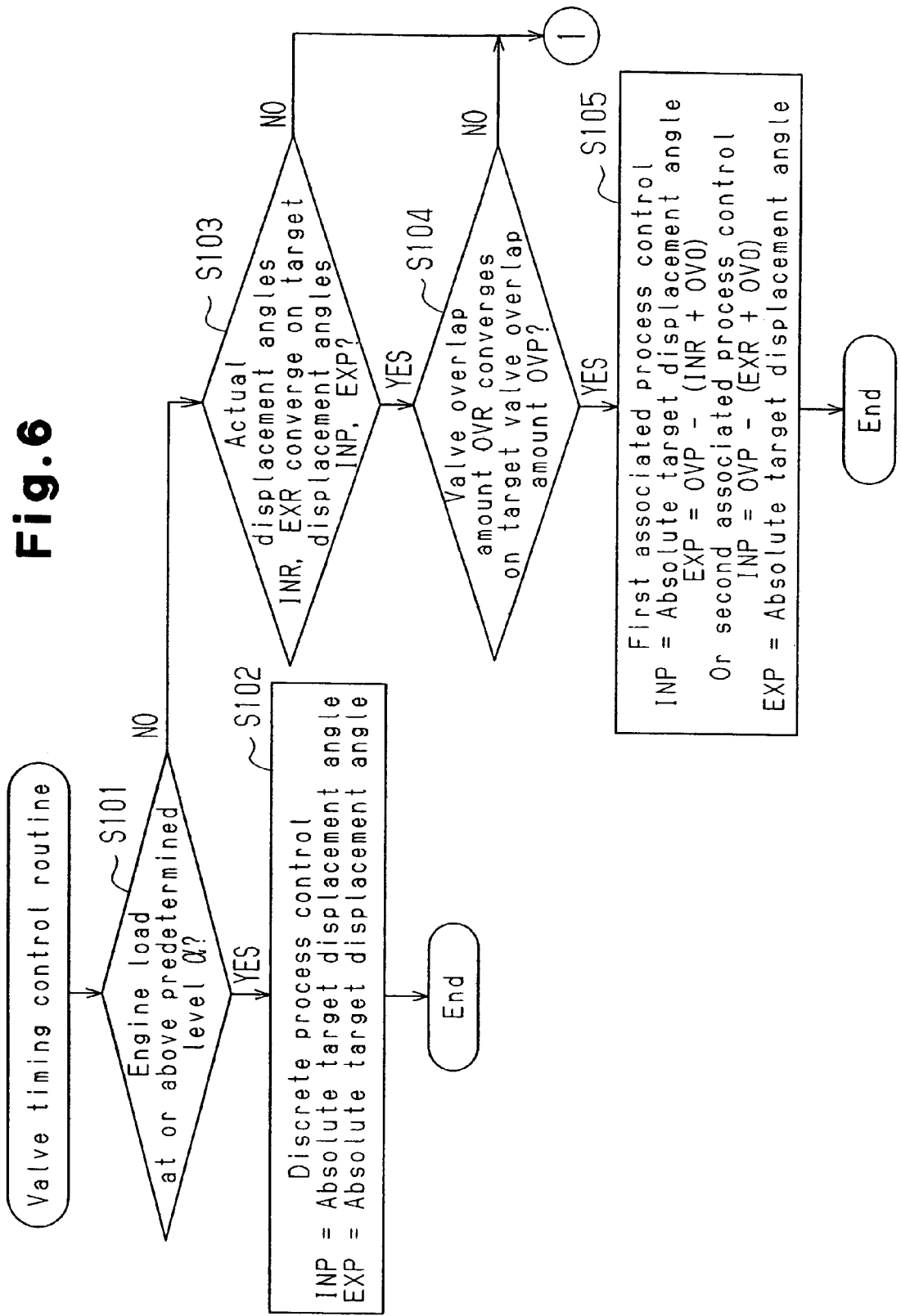

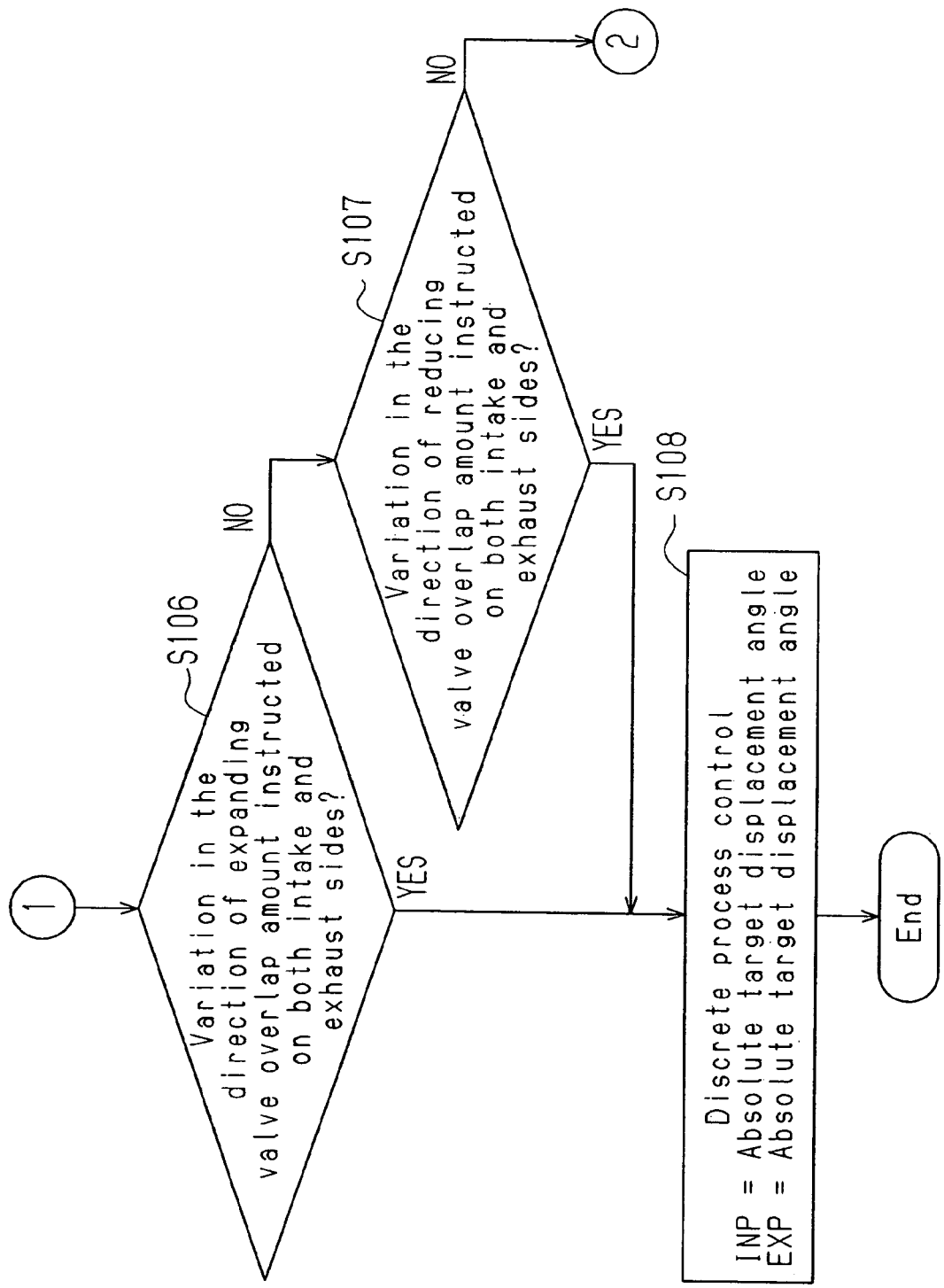

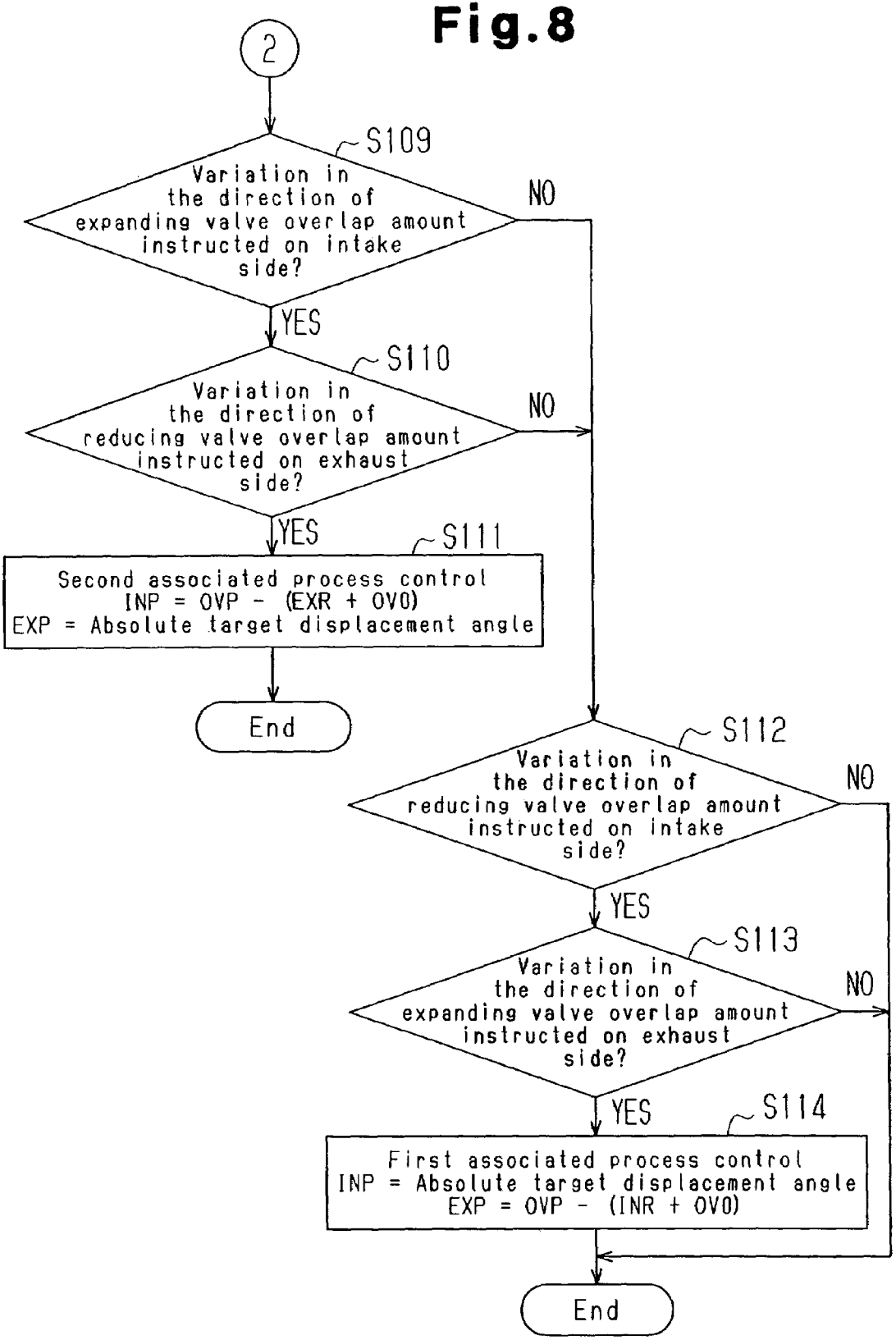

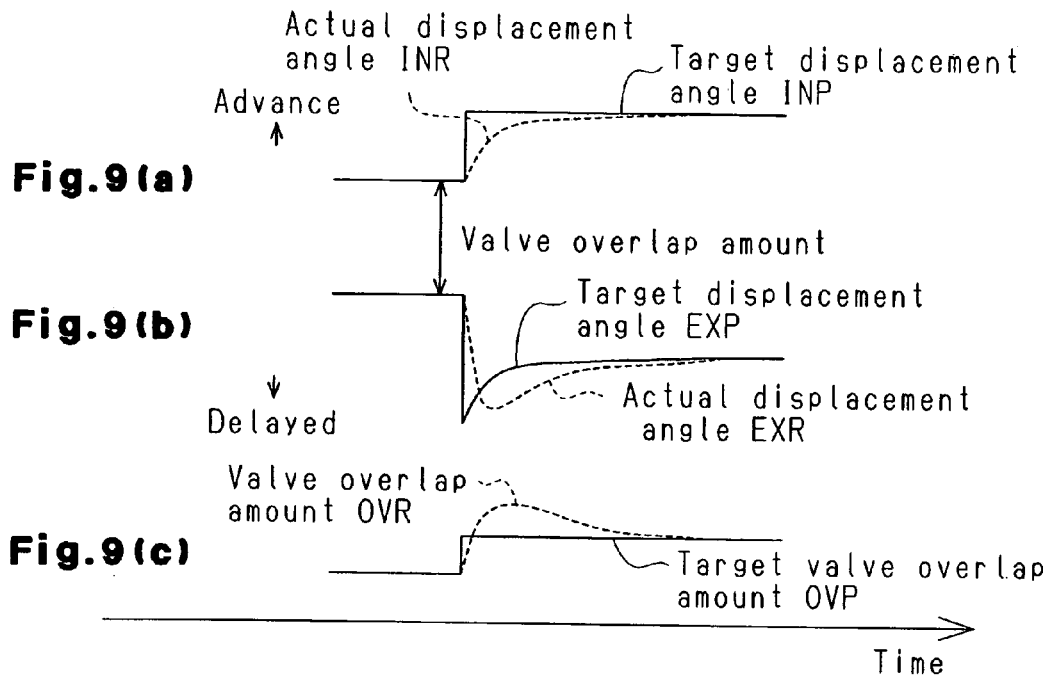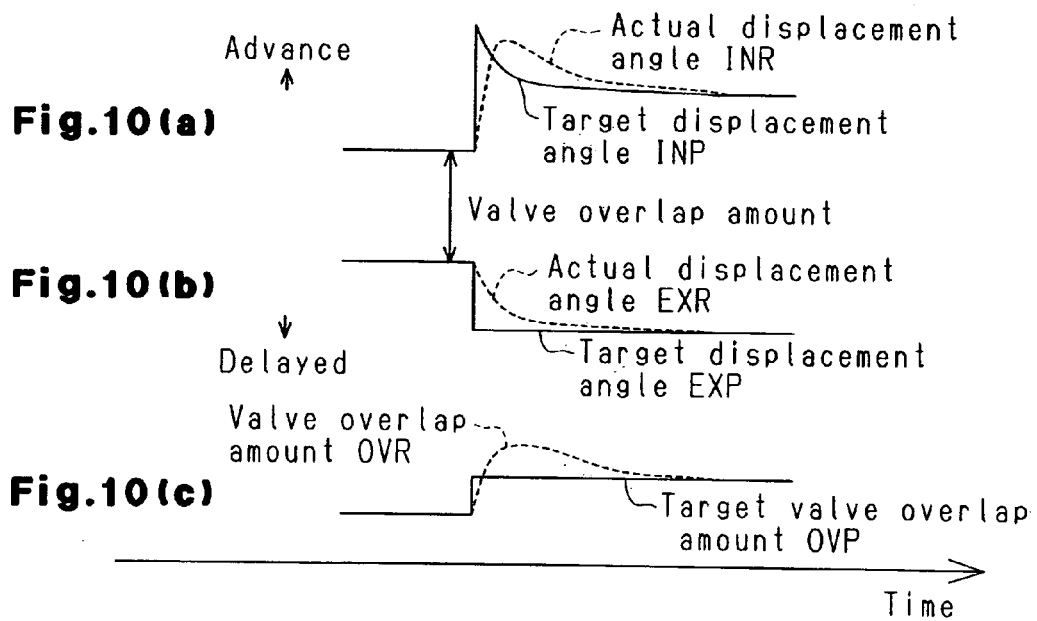

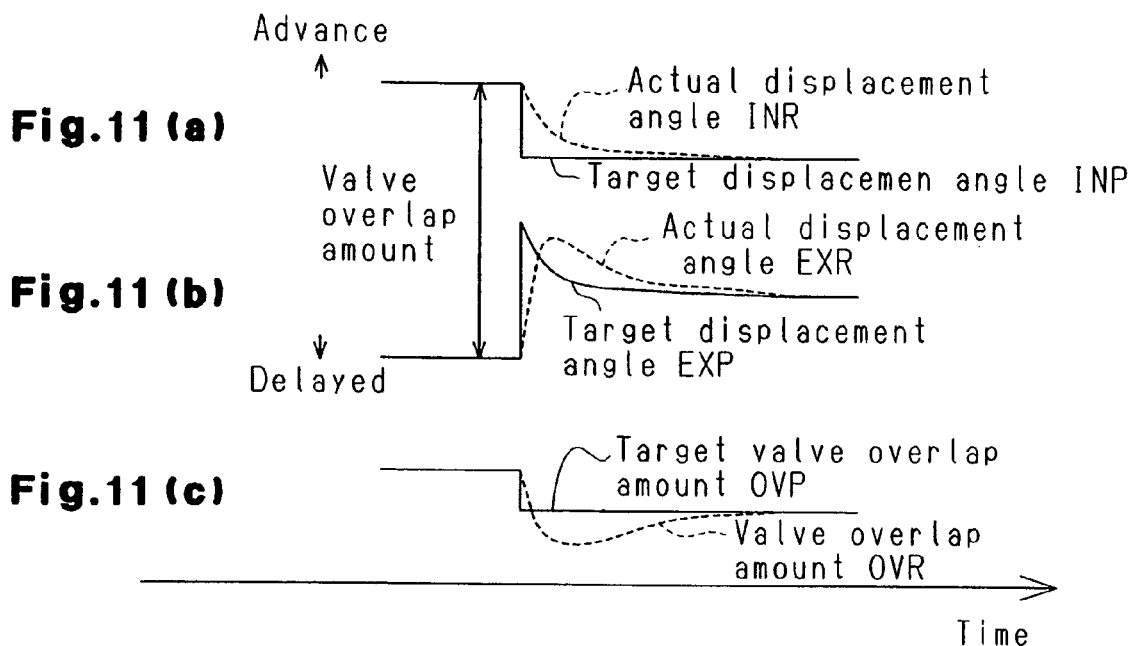
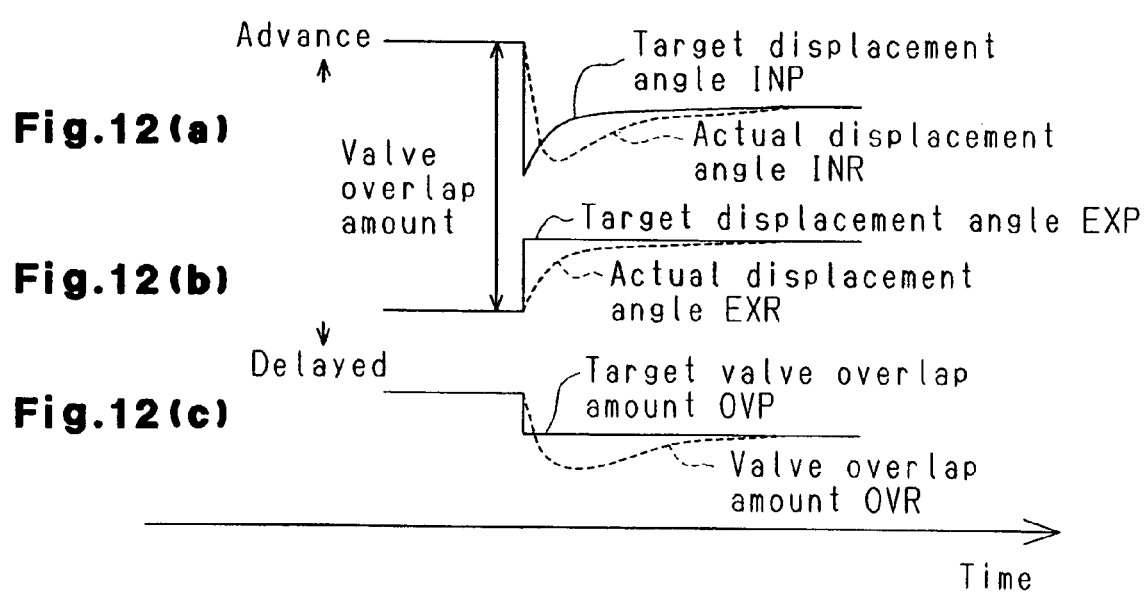

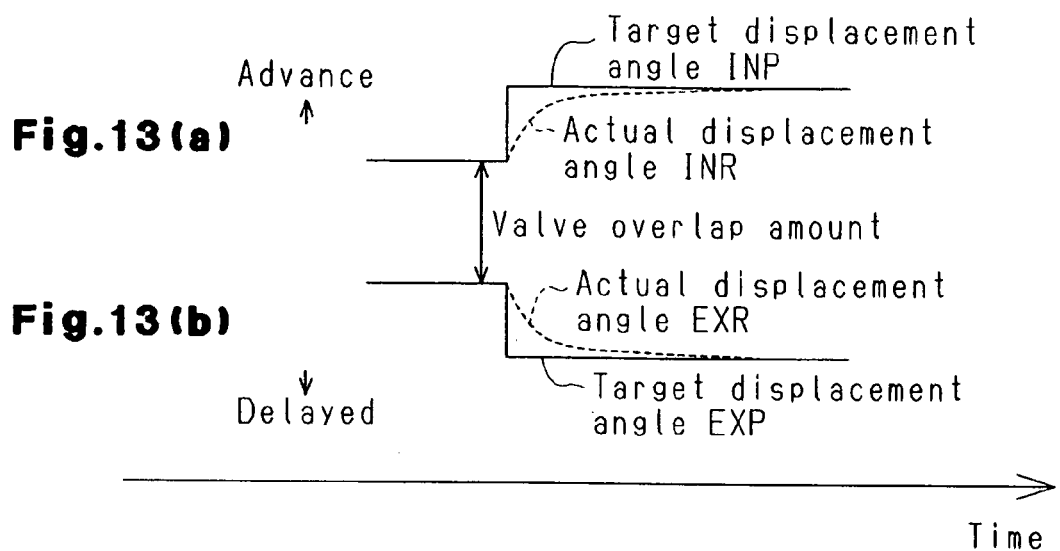
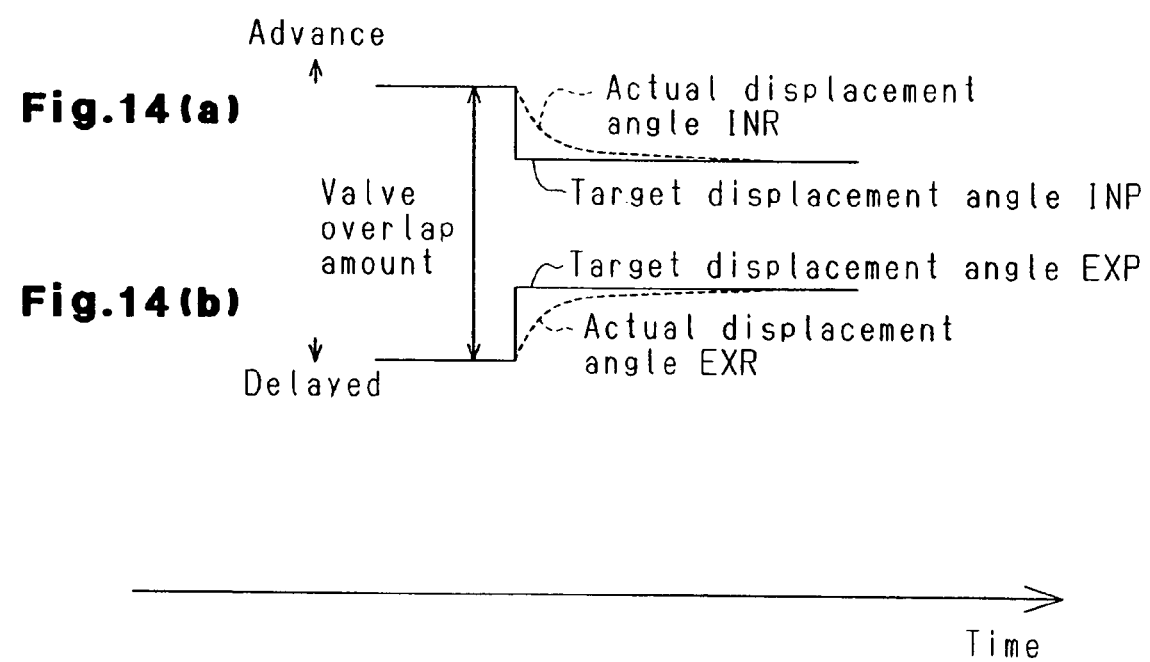

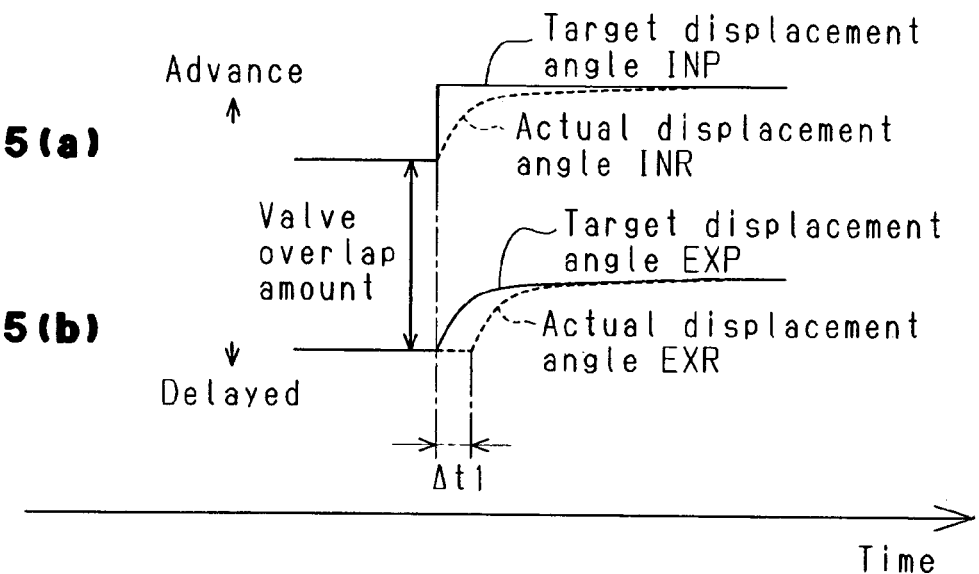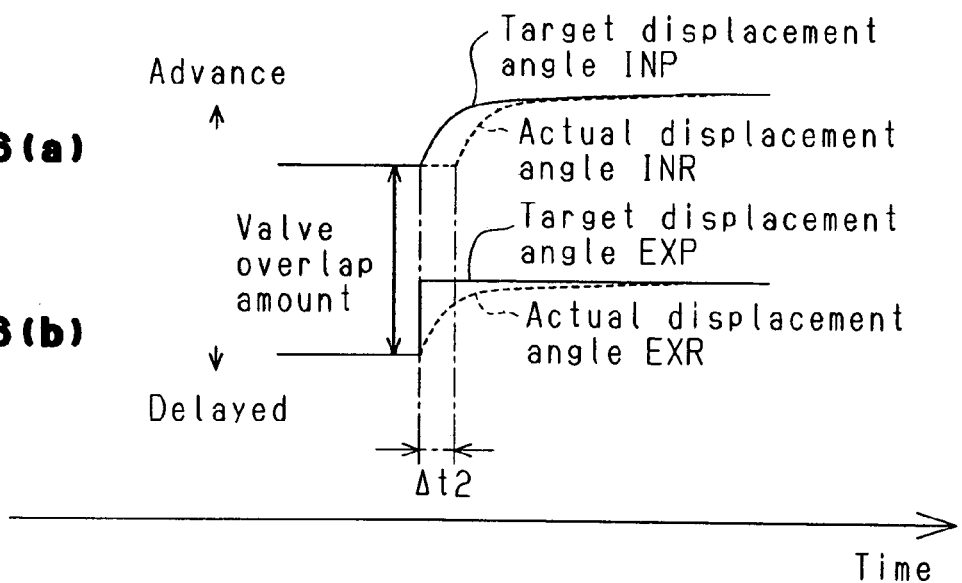

APPARATUS FOR CONTROLLING VALVE ACTUATION IN INTERNAL COMBUSTION ENGINE

FIELD OF THE INVENTION

The present invention relates to an apparatus for controlling valve actuation in internal combustion engines.

BACKGROUND OF THE INVENTION

Among vehicle-mounted internal combustion engines, some are known to have a variable valve actuation mechanism which varies the performances, including the timings (opening and closing) and the lifts, of engine valves, such as intake valves and exhaust valves for the purpose of enhancing the power output of or improving the cleanness of emissions from the engine. In such internal combustion engines, the variable valve actuation mechanism is controlled on the basis of the operating state of the engine, and the actuation of the engine valves is adjusted to be optimal for the given operating state of the engine. This adjustment serves to enhance the power output of or improve the cleanness of emissions from the internal combustion engines.

For instance, when the internal combustion engine is required to develop a high output, the actuation of the engine valves is so adjusted as to enhance the intake charging efficiency of the engine. By adjusting the actuation of the engine valves in this way with a view to enhancing the intake charging efficiency, combustion can be accomplished in a state in which the combustion chambers are filled with the largest possible volumes of mixture gas, and the power output of the internal combustion engine is thereby enhanced.

Where the power requirement of the internal combustion engine is not so high, the actuation of the engine valves is so adjusted as to maximize the internal EGR amount within a range that does not adversely affect the combustion. Thus, as the internal EGR amount changes in accordance with the valve overlap amount, the actuation of the engine valves is so adjusted as to realize a valve overlap which would give the maximum value of the internal EGR amount within the range described above. By increasing the internal EGR amount to the practicable maximum in this way, the generation of nitrogen oxides (NOx) is restrained even as the combustion temperature drops, resulting in improved emission contents of the internal combustion engine with respect to NOx.

Incidentally, in another internal combustion engine whose valves are made variable in actuation, the actuation of intake valves and that of exhaust valves are separately varied with a view to even more effective adjustment of the internal EGR amount to enhance the intake charging efficiency and improve emission cleanness. For instance, the Japanese Laid-Open Patent Publication No. 11-218035 discloses a configuration in which a variable valve actuation mechanism for varying the timing of intake valves and a variable valve actuation mechanism for varying that of exhaust valves are provided, the valve timings of both intake valves and exhaust valves can be varied by separately controlling these variable valve actuation mechanisms.

In this internal combustion engine, the target valve timing of the intake valves and that of the exhaust valves are separately computed according to the operating state of the engine. Then, the driving of the two variable valve actuation mechanisms are so controlled that the valve timings of the intake valves and of the exhaust valves reach the respective target valve timings separately computed. By adjusting the valve timings of both the intake valves and the exhaust valves in this way, the adjustment of the internal EGR amount to enhance the intake charging efficiency and improve emission cleanness to increase the output of the internal combustion engine can be made even more effective.

When the valve overlap amount is to be controlled to achieve the optimal amount corresponding to the operating state of the internal combustion engine in which the valve timings both the intake valves and the exhaust valves, the target valve timing of the intake valves and that of the exhaust valves are set to such values as enable the valve overlap to achieve the optimal amount mentioned above. Then, the valve timing of the intake valves and that of the exhaust valves are varied to their respective target timings. Such changes in the valve timings of the intake valves and of the exhaust valves eventually cause the valve overlap amount converge on its optimum (hereinafter referred to as the target valve overlap) to bring the valve overlap amount to its optimum.

However, when in the process of changing the valve timings of the intake valves and the exhaust valves to their respective target valve timings, delays in response to the changes would result in a deviation of the amount of the valve overlap from the target valve overlap. For instance, it is conceivable that, from a state in which the valve timings of the intake valves and the exhaust valves are converged on their respective target valve timings, the target valve overlap is varied by a change in the operating state of the engine or any cause, and that, to obtained the changed target valve overlap, the respective target valve timings of the two valves are changed. In this case, from the time the valve timings of the intake valves and the exhaust valves begin to change toward their respective target valve timings until they converge on the target timings, the valve overlap amount is off the target valve overlap.

There may also emerge a situation in which, while the valve timings of the intake valves and the exhaust valves are being changed according to the operating state of the engine either in the advancing direction or the delaying direction, the valve overlap amount is adjusted to the target valve overlap. In such a situation, the valve overlap amount may be made too great or too little by the difference between the response speed when the valve timing of the intake valves is varied and the response speed when the valve timing of the exhaust valves is varied. The difference in response speed between changes in the valve timings of the intake valves and the exhaust valves is due to the circumstance that, even if the same variable valve actuation mechanisms are used on the intake valve side and the exhaust valve side, it is unavoidable for the oil feed paths used for driving the two mechanisms to differ in length and for this difference to give rise to the aforementioned difference in response speed.

If any difference in the speed of response to changes in valve timing occurs between the intake valves and the exhaust valves when the valve timings of both are to be advanced delayed to the target valve timings, the valve overlap amount once varies in the direction away from the target valve overlap. Hereupon, with respect to each of the situations stated in [I] through [IV] below, the variations of the valve overlap amount away from the target valve overlap will be described below.

[I] Where the valve timings of both the intake valves and the exhaust valves are to be advanced to the target valve timing and the valve overlap amount is to be decreased toward the target valve overlap.

In this case, the valve timing of the intake valves is moved in the direction of increasing the valve overlap amount (advanced) while the valve timing of the exhaust valves is moved in the direction of decreasing the valve overlap amount (advanced), the valve overlap amount is thereby brought closer to the target valve overlap. However, if the response speed of advancing the valve timing of the intake valves (in the direction of increasing the valve overlap amount) is faster than that of advancing the valve timing of the exhaust valves (in the direction of decreasing the valve overlap amount), the valve overlap amount will once expand and vary in the direction away from the target valve overlap. As a consequence, in the process of varying the valve timings, the valve overlap amount will greatly deviate from the target valve overlap.

[II] Where the valve timings of both the intake valves and the exhaust valves are to be advanced to the target valve timing and the valve overlap amount is to be increased toward the target valve overlap.

In this case, as in [I], the valve timings of the intake valves and the exhaust valves are varied. However, if the response speed of advancing the valve timing of the intake valves (in the direction of increasing the valve overlap amount) is slower than that of advancing the valve timing of the exhaust valves (in the direction of decreasing the valve overlap amount), the valve overlap amount will once shrink and vary in the direction away from the target valve overlap. As a consequence, in the process of varying the valve timings, the valve overlap amount will greatly deviate from the target valve overlap.

[III] Where the valve timings of both the intake valves and the exhaust valves are to be delayed to the target valve timing and the valve overlap amount is to be decreased toward the target valve overlap.

In this case, the valve timing of the intake valves varies in the direction of decreasing the valve overlap amount (delayed) and the valve timing of the exhaust valves varies in the direction of increasing the valve overlap amount (delayed), thereby bringing the valve overlap amount closer to the target valve overlap. However, if the response speed of delaying the valve timing of the intake valves (in the direction of decreasing the valve overlap amount) is slower than that of delaying the valve timing of the intake valves (in the direction of increasing the valve overlap amount), the valve overlap amount will once expand and vary in the direction away from the target valve overlap. As a consequence, in the process of varying the valve timings, the valve overlap amount will greatly deviate from the target valve overlap.

[IV] Where the valve timings of both the intake valves and the exhaust valves are to be delayed to the target valve timing and the valve overlap amount is to be increased toward the target valve overlap.

In this case, as in [III], the valve timings of the intake valves and the exhaust valves are varied. However, if the response speed of delaying the valve timing of the intake valves (in the direction of decreasing the valve overlap amount) is faster than that of delaying the valve timing of the intake valves (in the direction of increasing the valve overlap amount), the amount of the valve overlap will once shrink and vary in the direction away from the target valve overlap. As a consequence, in the process of varying the valve timings, the valve overlap amount will greatly deviate from the target valve overlap.

As described above, if the valve overlap amount deviates from the target valve overlap in the process of altering the valve timings of the intake valves and the exhaust valves toward the target valve timing, the following troubles will occur regarding the operating state of the engine.

If the valve overlap amount deviates from the target valve overlap in the increasing direction, the internal EGR amount may become too large and bring down the combustion temperature unduly or the blow-by of intake from the intake passage to the exhaust passage may increase to destabilize combustion. Moreover, if the internal EGR amount becomes too large, gases not contributing to combustion out of the gases present in the combustion chambers during combustion may excessively increase with a corresponding decrease in oxygen volume, inviting combustion in an oxygen-deficient condition and accordingly an increase in HC emissions from the internal combustion engine.

On the other hand, if the valve overlap amount deviates from the target valve overlap in the decreasing direction, the internal EGR amount will become too small. As a consequence, a drop in combustion temperature due to internal EGR makes the temperature insufficient for restraining the generation of NOx, inviting an increase in NOx emission from the internal combustion engine. Furthermore, the deviation of the valve overlap amount from the target valve overlap in the decreasing direction leads to a drop in the fuel efficiency of the internal combustion engine.

Incidentally, the above-discussed troubles regarding the state of engine operation ensuing from the deviation of the valve overlap amount from the target valve overlap is generally true of the type of internal combustion engine in which the valve overlap amount is adjusted by separately varying other valve actuation than the valve timings of valves, such as the lifts of intake valves and exhaust valves.

SUMMARY OF THE INVENTION

An objective of the present invention is to provide an apparatus for valve actuation control in internal combustion engines, of which the actuation of both intake and exhaust valves can be varied, whereby the operating state of engines can be kept satisfactory when their valve actuation is varied.

To achieve the foregoing and other objectives of the present invention, an apparatus for controlling valve actuation in an internal combustion engine having intake and exhaust valves is provided. The apparatus controls valve actuation of the intake valve and valve actuation of the exhaust valve each to be a corresponding predetermined target valve actuation. The apparatus includes first computation means, second computation means, and selecting means. According to an operation state of the engine, the first computation means computes the target valve actuation of a first valve and a target valve overlap amount of the valves. The first valve is one of the intake valve and the exhaust valve. Based on the computed target valve overlap amount and an actual valve actuation of the first valve, the first computation means computes the target valve actuation of a second valve. The second valve is the other one of the intake valve and the exhaust valve. According to the operation state of the engine, the second computation means computes the target valve actuation of the intake valve and the target valve actuation of the exhaust valve. The selecting means that selects, as the target valve actuation of the intake valve and the target valve actuation of the exhaust valve, one of the computation result of the first computation means and the computation result of the second computation means according to the operation state of the engine. The selecting means selects the computation result of the second computation means when load on the engine is no less than a predetermined value.

The present invention provides another apparatus for controlling valve actuation in an internal combustion engine having intake and exhaust valves. The apparatus controls valve actuation of the intake valve and valve actuation of the exhaust valve each to be a corresponding predetermined target valve actuation. The apparatus includes first computation means, second computation means, and selecting means. According to an operation state of the engine, the first computation means computes the target valve actuation of a first valve and a target valve overlap amount of the valves. The first valve is one of the intake valve and the exhaust valve. Based on the computed target valve overlap amount and an actual valve actuation of the first valve, the first computation means computes the target valve actuation of a second valve. The second valve is the other one of the intake valve and the exhaust valve. According to the operation state of the engine, the second computation means computes the target valve actuation of the intake valve and the target valve actuation of the exhaust valve. The selecting means selects, as the target valve actuation of the intake valve and the target valve actuation of the exhaust valve, one of the computation result of the first computation means and the computation result of the second computation means according to the operation state of the engine. The selecting means selects the computation result of the first computation means when the valve actuation of the intake valve and the valve actuation of the exhaust valve each have converged on the corresponding target valve actuation and the valve overlap amount of the valves has converged on the target valve overlap amount.

Further, the present invention provides an apparatus for controlling valve actuation in an internal combustion engine having intake and exhaust valves. The apparatus controls valve actuation of the intake valve and valve actuation of the exhaust valve each to be a corresponding predetermined target valve actuation. The apparatus includes first computation means, second computation means, and selecting means. According to an operation state of the engine, the first computation means computes the target valve actuation of a first valve and a target valve overlap amount of the valves. The first valve is one of the intake valve and the exhaust valve. Based on the computed target valve overlap amount and an actual valve actuation of the first valve, the first computation means computes the target valve actuation of a second valve. The second valve is the other one of the intake valve and the exhaust valve. According to the operation state of the engine, the second computation means computes the target valve actuation of the intake valve and the target valve actuation of the exhaust valve. The selecting means selects, as the target valve actuation of the intake valve and the target valve actuation of the exhaust valve, one of the computation result of the first computation means and the computation result of the second computation means according to the operation state of the engine. The selecting means selects the computation result of the second computation means when the valve actuation of the intake valve and the valve actuation of the exhaust valve are both changed to increase or reduce the valve overlap amount.

In another aspect of the present invention, an apparatus for controlling valve actuation in an internal combustion engine having intake and exhaust valves is provided. The apparatus controls valve actuation of the intake valve and valve actuation of the exhaust valve each to be a corresponding predetermined target valve actuation. The apparatus includes primary process control means and secondary process control means. The primary process control means computes the target valve actuation of a first valve according to an operation state of the engine. The first valve is one of the intake valve and the exhaust valve. The primary process control means controls the valve actuation of the first valve to be the computed valve actuation. The secondary process control means computes the target valve actuation of a second valve based on a target valve overlap amount of the valves, which overlap amount is computed according to the operation state of the engine, and an actual valve actuation of the first valve. The second valve is the other one of the intake valve and the exhaust valve. The secondary process control means controls the valve actuation of the second valve to be the computed valve actuation. When one of the valve actuation of the intake valve and the valve actuation of the exhaust valve is changed to increase the valve overlap amount and the other valve actuation is changed to reduce the valve overlap amount, the primary process control means and the secondary process control means execute the valve actuation control by setting the valve that is related to the reduction of the valve overlap amount as the first valve and setting the valve that is related to the increase of the valve overlap amount as the second valve.

In yet another aspect of the present invention, an apparatus for controlling valve actuation in an internal combustion engine having intake and exhaust valves is provided. The apparatus controls valve timing of the intake valve and valve timing of the exhaust valve each to be a corresponding predetermined target valve timing. The apparatus includes primary process control means and second process control means. The primary process control means computes the target valve timing of a first valve according to an operation state of the engine. The first valve is one of the intake valve and the exhaust valve. The primary process control means controls the valve timing of the first valve to be the computed valve timing. The secondary process control means computes the target valve timing of a second valve based on a target valve overlap amount of the valves, which overlap amount is computed according to the operation state of the engine, and an actual valve timing of the first valve. The second valve is the other one of the intake valve and the exhaust valve. The secondary process control means controls the valve timing of the second valve to be the computed valve timing. When the valve timing of the intake valve and the valve timing of the exhaust valve are both being advanced, the primary process control means and the secondary process control means execute the valve timing control by setting the exhaust valve as the first valve and setting the intake valve as the second valve. When the valve timing of the intake valve and the valve timing of the exhaust valve are both being delayed, the primary process control means and the secondary process control means execute the valve timing control by setting the intake vale as the first valve and setting the exhaust valve as the second valve.

BRIEF DESCRIPTION OF THE DRAWINGS

FIG. 2 shows the relationships between the displacement angles of the intake camshaft and the exhaust camshaft, and the valve overlap amount;

FIGS. 3(a) to 3(c) show states in which an actual displacement angle INR of the intake camshaft and an actual displacement angle EXR of the exhaust camshaft have converged on respective target displacement angles INP and EXP, and an valve overlap amount OVR has converged on a target valve overlap amount ovp;

FIGS. 4(a) to 4(c) show states in which the actual displacement angle INR of the intake camshaft and the actual displacement angle EXR of the exhaust camshaft have converged on the respective target displacement angles INP and EXP, and the valve overlap amount OVR has converged on the target valve overlap amount OVP;

FIGS. 5(a) to 5(c) show states in which the actual displacement angle INR of the intake camshaft and the actual displacement angle EXR of the exhaust camshaft have converged on the respective target displacement angles INP and EXP, and the valve overlap amount OVR has converged on the target valve overlap amount OVP;

FIG. 6 is a flowchart showing the procedure of controlling the valve timings of the intake valves and the exhaust valves;

FIG. 7 is a flowchart showing the procedure of controlling the valve timings of the intake valves and the exhaust valves;

FIG. 8 is a flowchart showing the procedure of controlling the valve timings of the intake valves and the exhaust valves;

FIGS. 9(a) to 9(c) constitute a time chart showing changes of the target displacement angle INP and the actual displacement angle INR, the target displacement angle EXP and the actual displacement angle EXR, and the actual valve overlap amount OVR and the target valve overlap amount OVP, in a case where first associated process control is executed when the valve overlap amount increases;

FIGS. 10(a) to 10(c) constitute a time chart showing changes of the target displacement angle INP and the actual displacement angle INR, the target displacement angle EXP and the actual displacement angle EXR, and the actual valve overlap amount OVR and the target valve overlap amount OVP, in a case where second associated process control is executed when the valve overlap amount increases;

FIGS. 11(a) to 11(c) constitute a time chart showing changes of the target displacement angle INP and the actual displacement angle INR, the target displacement angle EXP and the actual displacement angle EXR, and the actual valve overlap amount OVR and the target valve overlap amount OVP, in a case where the first associated process control is executed when the valve overlap amount decreases;

FIGS. 12(a) to 12(c) constitute a time chart showing changes of the target displacement angle INP and the actual displacement angle INR, the target displacement angle EXP and the actual displacement angle EXR, and the actual valve overlap amount OVR and the target valve overlap amount OVP, in a case where the second associated process control is executed when the valve overlap amount decreases;

FIGS. 13(a) and 13(b) constitute a time chart showing changes of the target displacement angle INP and the actual displacement angle INR, the target displacement angle EXP and the actual displacement angle EXR, and the actual valve overlap amount OVR and the target valve overlap amount OVP, in a case where discrete process control is executed when the valve overlap amount increases;

FIGS. 14(a) and 14(b) constitute a time chart showing changes of the target displacement angle INP and the actual displacement angle INR, the target displacement angle EXP and the actual displacement angle EXR, and the actual valve overlap amount OVR and the target valve overlap amount OVP, in a case where discrete process control is executed when the valve overlap amount decreases;

FIGS. 15(a) and 15(b) constitute a time chart showing changes of the target displacement angle INP and the actual displacement angle INR, and the target displacement angle EXP and the actual displacement angle EXR, in a case where the valve timings of both intake and exhaust valves are advanced and the first associated process control is executed;

FIGS. 16(a) and 16(b) constitute a time chart showing changes of the target displacement angle INP and the actual displacement angle INR, and the target displacement angle EXP and the actual displacement angle EXR, in a case where the valve timings of both intake and exhaust valves are advanced and the second associated process control is executed;

Figures 17A, 17B, 18A, 18B:
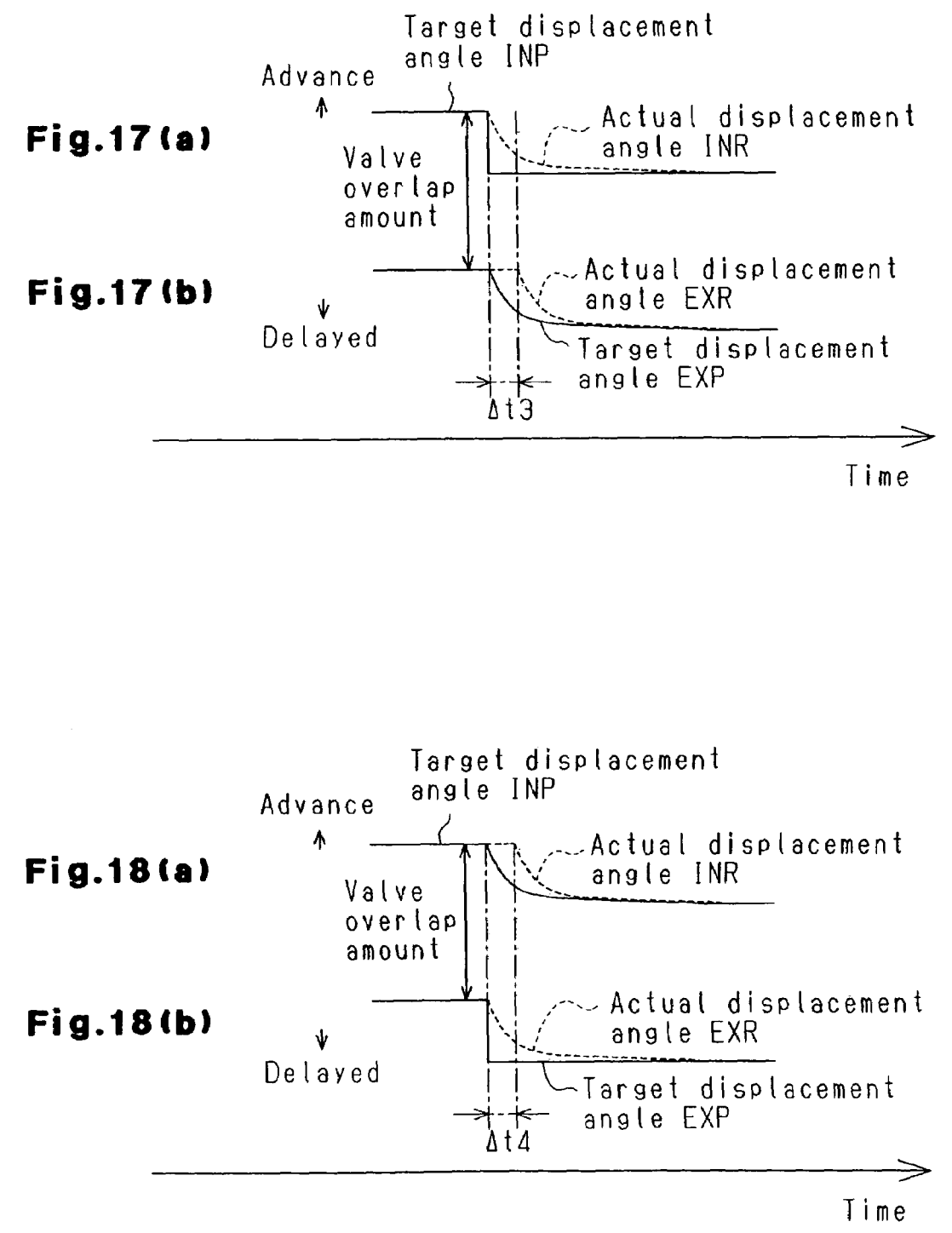

FIGS. 17(a) and 17(b) constitute a time chart showing changes of the target displacement angle INP and the actual displacement angle INR, and the target displacement angle EXP and the actual displacement angle EXR, in a case where the valve timings of both intake and exhaust valves are delayed and the first associated process control is executed; and FIG. 18(a) and FIG. 18(b) constitute a time chart showing changes of the target displacement angle INP and the actual displacement angle INR, and the target displacement angle EXP and the actual displacement angle EXR, in a case where the valve timings of both intake and exhaust valves are delayed and the second associated process control is executed.

DETAILED DESCRIPTION OF THE PREFERRED EMBODIMENTS

Figure 1:
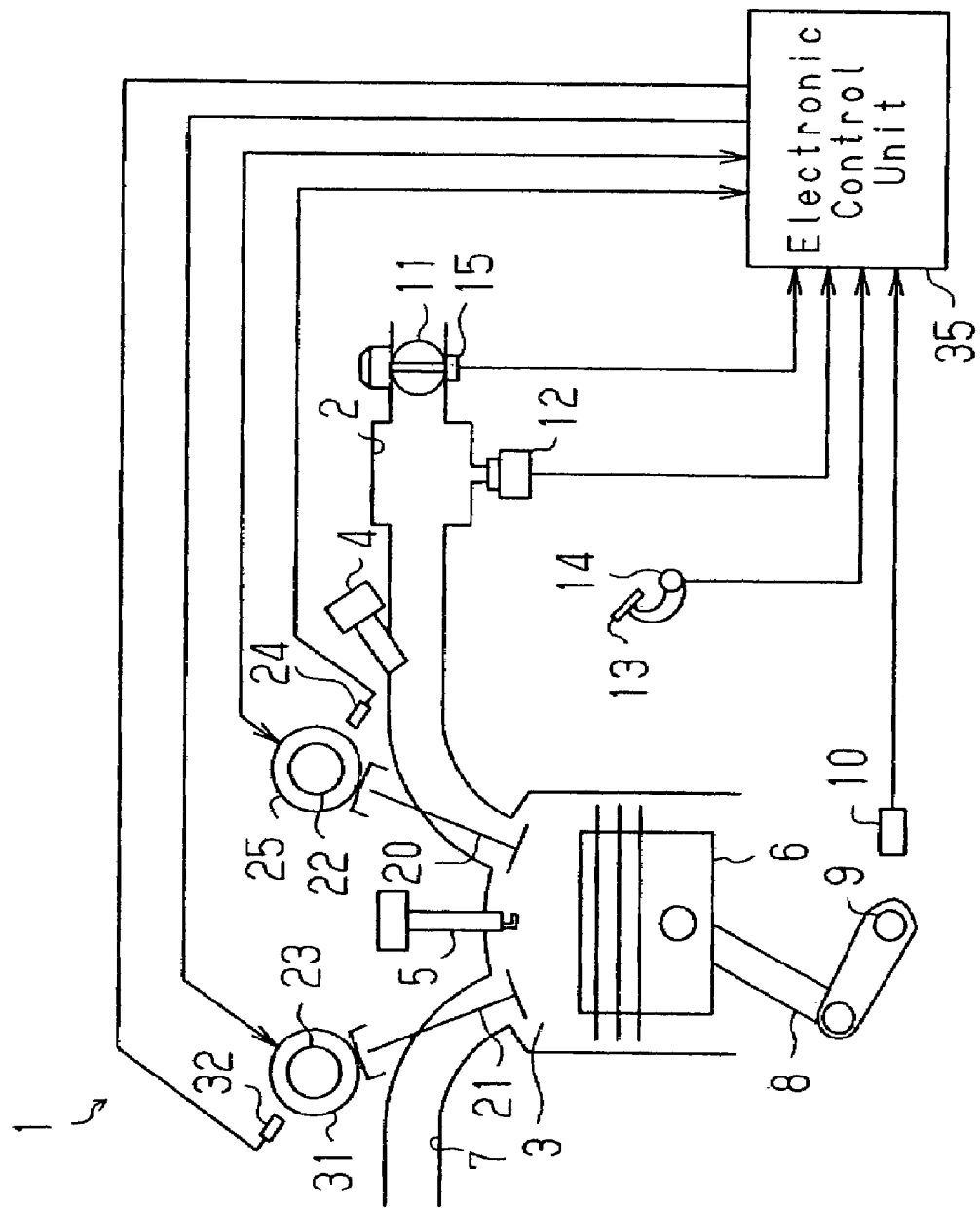
FIG. 1 is a schematic diagram of a whole engine provided with a valve actuation control apparatus according to one embodiment of the present invention.

One embodiment of the present invention will be described below with reference to FIGS. 1 to 18(b).

In an engine 1 shown in FIG. 1, a combustion chamber 3 is filled with mixture gas consisting of air flowing through an intake passage 2 and fuel injected by a fuel injection valve 4, and this mixture gas is ignited by an ignition plug 5. When this ignition causes the mixture gas in the combustion chamber 3 to be combusted, the resultant combustion energy reciprocates a piston 6. This reciprocation of the piston 6 is converted by a connecting rod 8 into rotation of a crankshaft 9, which is the output shaft of the engine 1. On the other hand, gas generated by the combustion is discharged as exhaust from the combustion chamber 3 to a discharge passage 7.

In the engine 1, communication between the intake passage 2 and the combustion chamber 3 is established or cut off by the opening or closing of an intake valve 20, and communication between the discharge passage 7 and the combustion chamber 3 is established or cut off by the opening or closing of an exhaust valve 21. The intake valve 20 and the exhaust valve 21 are opened or closed along with rotation of an intake camshaft 22 and an exhaust camshaft 23, to which rotation of the crankshaft 9 is transmitted, and pressed by the intake cam and the exhaust cam of the camshafts 22 and 23, respectively.

The intake camshaft 22 is provided with an intake side variable valve timing mechanism 25 that varies the valve timing (open/close timing) as actuation of the intake valve 20 by altering the rotational phase of the intake camshaft 22 relative to rotation of the crankshaft 9. By hydraulically driving this intake side variable valve timing mechanism 25 and advancing or delaying the open period of the intake valve 20, the open period and the closed period of the intake valve 20 are varied.

Also, the exhaust camshaft 23 is provided with an exhaust side variable valve timing mechanism 31 that varies the valve timing (open/close timing) as actuation of the exhaust valve 21 by altering the rotational phase of the exhaust camshaft 23 relative to rotation of the crankshaft 9. By hydraulically driving this exhaust side variable valve timing mechanism 31 and advancing or delaying the open period of the exhaust valve 21, the open period and the closed period of the exhaust valve 21 are varied.

Next will be described the electrical configuration of the valve actuation control apparatus of the engine 1.

In the engine 1, hydraulic driving of the intake side variable valve timing mechanism 25 and the exhaust side variable valve timing mechanism 31 is controlled through an electronic control unit 35 mounted on the automobile to control operation of the engine 1. To the electronic control unit 35 are entered detection signals from various sensors listed below.

A crank position sensor 10 for supplying signals corresponding to rotation of the crankshaft 9.

An intake side cam position sensor 24 for detecting the rotational position of the intake camshaft 22.

An exhaust side cam position sensor 32 for detecting the rotational position of the exhaust camshaft 23.

An accelerator position sensor 14 for detecting the depression degree of an accelerator pedal 13 stepped on by the driver of the vehicle (accelerator pedal depression degree).

A throttle position sensor 15 for detecting the aperture of a throttle valve 11 that is provided on the intake passage 2, and opened or closed to vary the air flow area of the passage 2.

A vacuum sensor 12 for detecting the pressure in a section downstream of the throttle valve 11 (suction pressure) in the intake passage 2.

The electronic control unit 35 controls the valve timing of the intake valve 20 by controlling the actuation of the intake side variable valve timing mechanism 25. In this valve timing control of the intake valve 20, the intake side variable valve timing mechanism 25 is so driven as to bring the actual valve timing of the valve 20 closer to the target valve timing. Here are used the actual displacement angle of the intake camshaft 22 as the actual valve timing of the intake valve 20 and the target displacement angle of the intake camshaft 22 as the target valve timing of the intake valve 20.

Also, the electronic control unit 35 controls the valve timing of the exhaust valve 21 by controlling the actuation of the exhaust side variable valve timing mechanism 31. In this valve timing control of the exhaust valve 21, the exhaust side variable valve timing mechanism 31 is so driven as to bring the actual valve timing of the exhaust valve 21 closer to the target valve timing. Here are used the actual displacement angle of the exhaust camshaft 23 as the actual valve timing of the exhaust valve 21 and a target displacement angle of the exhaust camshaft 23 as a target valve timing of the exhaust valve 21.

Incidentally, the displacement angle used in the valve timing control represents the rotational phase of the camshaft relative to the crankshaft, and the degree of its variation is converted into the crank angle (° CA).

The actual displacement angle of the intake camshaft 22 is computed from detection signals from the crank position sensor 10 and the intake side cam position sensor 24. The actual displacement angle, which is supposed to be 0° CA when the valve timing of the intake valve 20 is delayed to the maximum, indicates how much the valve timing of the intake valve 20 is advanced from its maximum delayed timing. Also, the actual displacement angle of the exhaust valve 21 is computed from detection signals from the crank position sensor 10 and the exhaust side cam position sensor 32. This actual displacement angle, which is supposed to be 0° CA when the valve timing of the exhaust valve 21 is advanced to the maximum, indicates how much the valve timing of the exhaust valve 21 is delayed from its maximum advanced timing.

Hereupon, the relationships between the displacement angle and the valve overlap amount in the intake valve 20 and the exhaust valve 21 will be explained with concurrent reference to the timing chart of FIG. 2 showing changes of the valve timings of the intake valve 20 and of the exhaust valve 21 relative to variations in crank angle.

The valve overlap amount is a value corresponding to the amount of change of the crank angle during a period from when the exhaust valve 21 is closed to when the intake valve 20 is opened. If, for instance, the intake valve 20 is opened after the crank angle has varied by $\theta$ from the time the exhaust valve 21 is closed, it will take a value of $-\theta$. This valve overlap amount is, for instance, when both the actual displacement angle of the intake camshaft 22 and the actual displacement angle of the exhaust camshaft 23 are 0° CA as indicated by broken lines in FIG. 2, the initial value OV0 (for example −24° CA in this embodiment). Therefore, an actual amount of the valve overlap OVR can be represented by Equation (1) below by using an actual displacement angle INR of the intake camshaft 22, an actual displacement angle EXR of the exhaust camshaft 23, and the initial value OV0.

$$OVR = INR + EXR + OV0 \qquad (1)$$

OVR: Actual valve overlap amount
INR: Actual displacement angle of the intake camshaft
EXR: Actual displacement angle of the exhaust camshaft
OV0: Initial value of the valve overlap amount Next will be outlined the control of the valve timings of the intake valve 20 and of the exhaust valve 21.

In this embodiment, three manners of valve timing control are applied to the intake valve 20 and the exhaust valve 21, including discrete process control, first associated process control, and second associated process control, according to the state of engine operation. The discrete process control is a way of valve timing control with priority given to prompt alteration of the valve timings themselves of the intake valve 20 and of the exhaust valve 21 (the actual displacement angles INR and EXR) to the optional value depending on the state of engine operation. The first and second associated process controls are ways of controlling the valve timings of the intake valve 20 and the exhaust valve 21 control with priority given to keeping the valve overlap amount OVR at the optimal value corresponding to the operating state of the engine.

The discrete process control, the first associated process control, and the second associated process control will be individually described in detail below.

[Discrete Process Control]

This manner of valve timing control uses a target displacement angle INP of the intake camshaft 22 and a target displacement angle EXP of the exhaust camshaft 23.

The target displacement angle INP of the intake camshaft 22, which is computed with reference to a map predetermined on the basis of the engine speed and the engine load, is the value representing the optimal displacement angle INP of the intake camshaft 22 corresponding to the state of engine operation at the time (hereinafter referred to as the absolute target displacement angle). The engine speed here is computed on the basis of a detection signal from the crank position sensor 10, and the engine load, on the basis of parameters relevant to the engine speed and the air intake amount of the engine 1. Such parameters usable for this purpose include the suction pressure of the engine 1, throttle aperture, accelerator pedal depression degree and so forth.

On the other hand, the target displacement angle EXP of the exhaust camshaft 23 is computed using Equation (2) below based on a target valve overlap amount OVP computed with reference to a map predetermined on the basis of the engine speed and the engine load, and the aforementioned target displacement angle INP of the intake camshaft 22.

$$EXP=OVP-(INP+OV0) \qquad (2)$$

EXP: Target displacement angle of the exhaust camshaft
OVP: Target valve overlap
INP: Target displacement angle of the intake camshaft
OV0: Initial value of the valve overlap amount Equation (2) is obtained by modifying the above-cited Equation (1) of the relationship between the displacement angle and the valve overlap amount, by replacing the valve overlap amount OVR with the target valve overlap amount OVP and the actual displacement angle EXR of the exhaust camshaft 23 with the target displacement angle EXP. Incidentally, the target valve overlap amount OVP is a theoretical value of the optimal valve overlap amount corresponding to the state of engine operation at the time. For this reason, the target displacement angle EXP of the exhaust camshaft 23 computed by using Equation (2) represents the optimal displacement angle of the exhaust camshaft 23 corresponding to the state of engine operation at the time (hereinafter referred to as the absolute target displacement angle).

As described above, under the discrete process control, the target displacement angles INP and EXP of the intake camshaft 22 and the exhaust camshaft 23 are computed as respectively optimal values corresponding to the state of engine operation. The computing logic for the target displacement angles INP and EXP under this discrete process control corresponds to second computation means, and will be hereinafter referred to as discrete process control computing logic. Under the discrete process control, the driving of the intake side variable valve timing mechanism 25 and the exhaust side variable valve timing mechanism 31 is so controlled as to bring the actual displacement angles INR and EXR closer to the target displacement angles INP and EXP computed by the discrete process control computing logic.

Under this discrete process control, if the actual displacement angles INR and EXR were varying always in coincidence with the target displacement angles INP and EXP (the absolute target angles), it would mean that the actual displacement angles INR and EXR are promptly varied to the target displacement angles INP and EXP while maintaining the target valve overlap amount OVP. However, since the variations of the actual displacement angles INR and EXR lag behind those of the target displacement angles INP and EXP, though the actual displacement angles INR and EXR can be promptly varied to the target displacement angles INP and EXP, it is difficult to maintain the target valve overlap amount OVP during the period of delay. Therefore, in the discrete process control, valve timing control prioritizes prompt change of the actual displacement angles INR and EXR toward the target displacement angles INP and EXP over maintaining the target valve overlap amount OVP.

To add, under this discrete process control, the control of the valve timing of the intake valve 20 and the control of the valve timing of the exhaust valve 21 correspond to valve actuation control by discrete process control means.

[First Associated Process Control]

This manner of valve timing control also uses the target displacement angle INP of the intake camshaft 22 and the target displacement angle EXP of the exhaust camshaft 23. The target displacement angle INP of the intake camshaft 22, as under the discrete process control, is computed with reference to a map on the basis of the engine speed and the engine load. On the other hand, the target displacement angle EXP of the exhaust camshaft 23 is computed by using Equation (3) below on the basis of the target valve overlap amount OVP and the actual displacement angle INR of the intake camshaft 22.

$$EXP=OVP-(INR+OV0) \qquad (3)$$

EXP: Target displacement angle of the exhaust camshaft
OVP: Target valve overlap
INR: Actual displacement angle of the intake camshaft
OV0: Initial value of the valve overlap amount This Equation (3) is obtained by modifying the above-cited Equation (2) by replacing the target displacement angle INP of the intake camshaft 22 with the actual displacement angle INR. For this reason, the target displacement angle EXP of the exhaust camshaft 23 computed by using Equation (3) represents the optimal valve overlap amount corresponding to the state of engine operation at the time, i.e. a value representing the displacement angle of the exhaust camshaft 23 which enables the target valve overlap amount OVP to be maintained. Therefore, the target displacement angle EXP computed by using Equation (3) is not always the optimal value corresponding to the state of engine operation at the time (the absolute target displacement angle).

As described above, under the first associated process control, the target displacement angle INP of the intake camshaft 22 is computed as the optimal value corresponding to the state of engine operation, and the target displacement angle EXP of the exhaust camshaft 23 is so computed as to maintain the target valve overlap amount OVP to correspond to the actual displacement angle INR which is varied toward the target displacement angle INP. The computing logic for the target displacement angles INP and EXP under this first associated process corresponds to first computation means, and will be hereinafter referred to as the first associated process control computing logic. The driving of the intake side variable valve timing mechanism 25 and the exhaust side variable valve timing mechanism 31 is so controlled as to bring the actual displacement angles INR and EXR closer to the target displacement angles INP and EXP computed by the computing logic for the first associated process control.

Incidentally, in the first associated process control, control of the valve timing of the intake valve 20 corresponds to the control of valve actuation by primary process control means, and control of the valve timing of the exhaust valve 21 corresponds to the control of valve actuation by secondary process control means. Therefore, under the first associated process control, the control of valve actuation by the primary process control means is applied to the intake valve 20, and the control of valve actuation by the secondary process control means is applied to the exhaust valve 21.

Under this first associated process control, the valve timings of the intake valve 20 and of the exhaust valve 21 can be varied, i.e. the displacement angles of the intake camshaft 22 and of the exhaust camshaft 23 can be varied while maintaining the target valve overlap amount OVP. Further, even if the speed of response differs in varying the displacement angles of the intake camshaft 22 and of the exhaust camshaft 23, the variation of the valve overlap amount OVR away from the target valve overlap amount OVP due to that difference in response speed can be kept small. Therefore, by executing the first associated process control as the control of the valve timings of the intake valve 20 and of the exhaust valve 21, deterioration in engine operating state due to the deviation of the valve overlap amount OVR from the target valve overlap amount OVP at the time of varying the valve timing is restrained, which makes it possible to keep the state of engine operation satisfactory.

However, since the displacement angle of the exhaust camshaft 23 is so varied under the first associated process control as to maintain the target valve overlap amount OVP all the time, the displacement angle of the exhaust camshaft 23 is correspondingly delayed in reaching the optimal value corresponding to the state of engine operation (the absolute target displacement angle). Therefore, in the first associated process control, valve timing control prioritizes maintaining the target valve overlap amount OVP over prompt change of the actual displacement angles INR and EXR to the optimal value corresponding to the state of engine operation (the absolute target displacement angle).

[Second Associated Process Control]

This manner of valve timing control also uses the target displacement angle INP of the intake camshaft 22 and the target displacement angle EXP of the exhaust camshaft 23. However, unlike under the first associated process control, the target displacement angle EXP of the exhaust camshaft 23 is computed as the optimal value corresponding to the state of engine operation (the absolute target displacement angle) by using Equation (2) as under the discrete process control. On the other hand, the target displacement angle EXP of the intake camshaft 22 is computed by using Equation (4) below on the basis of the target valve overlap amount OVP and the actual displacement angle EXR of the exhaust camshaft 23.

$$INP = OVP - (EXR + OV0) \quad (4)$$

INP: Target displacement angle of the intake camshaft
OVP: Target valve overlap
EXR: Actual displacement angle of the exhaust camshaft
OV0: Initial value of the valve overlap amount This Equation (4) is obtained by modifying the above-cited Equation (1) of the relationship between the displacement angle and the valve overlap amount by replacing the valve overlap amount OVR with the target valve overlap amount OVP and the actual displacement angle INR of the intake camshaft 22 with the target displacement angle INP. The target displacement angle INP of the intake camshaft 22 computed by using Equation (4) is a value that allows the target valve overlap amount OVP to be maintained to correspond to the actual displacement angle EXR of the exhaust camshaft 23 varied toward the target displacement angle EXP (the absolute target displacement angle). For this reason, the target displacement angle INP computed by using Equation (4) is not always the optimal value corresponding to the state of engine operation at the time (the absolute target displacement angle).

The computing logic for the target displacement angles INP and EXP under this second associated process control corresponds to first computation means, and will be hereinafter referred to as the computing logic for the second associated process control. The driving of the intake side variable valve timing mechanism 25 and the exhaust side variable valve timing mechanism 31 is so controlled as to bring the actual displacement angles INR and EXR closer to the target displacement angles INP and EXP computed by the computing logic for the second associated process control.

Incidentally, in the second associated process control, control of the valve timing of the exhaust valve 21 corresponds to the control of valve actuation by the primary process control means, and control of the valve timing of the intake valve 20, to the secondary process control means. Therefore, under the second associated process control, the control of valve actuation by the primary process control means is applied to the exhaust valve 21, and the control of valve actuation by the secondary process control means is applied to the intake valve 20.

Under this second associated process control, also, when the valve timings of the intake valve 20 and of the exhaust valve 21 can be varied, i.e. the displacement angles of the intake camshaft 22 and of the exhaust camshaft 23 can be varied while maintaining the target valve overlap amount OVP. Furthermore, even if the speed of response differs in varying the displacement angles of the intake camshaft 22 and of the exhaust camshaft 23, the variation of the valve overlap amount OVR away from the target valve overlap amount OVP due to that difference in response speed can be kept small. Therefore, by executing the second associated process control as the control of the valve timings of the intake valve 20 and of the exhaust valve 21, deterioration in engine operating state due to the deviation of the valve overlap amount OVR from the target valve overlap amount OVP at the time of varying the valve timing can be restrained, which makes it possible to keep the state of engine operation satisfactory.

However, since the displacement angle of the intake camshaft 22 is so varied under the second associated process control as to maintain the target valve overlap amount OVP all the time, the displacement angle of the intake camshaft 22 is correspondingly delayed in reaching the optimal value corresponding to the state of engine operation (the absolute target displacement angle). Therefore, in the second associated process control, valve timing control prioritizes maintaining the target valve overlap amount OVP over prompt change of the actual displacement angles INR and EXR to the optimal values corresponding to the state of engine operation (the absolute target displacement angles).

Next will be described how to differentiate the use of the discrete process control, the first associated process control, and the second associated process control described above according to the state of engine operation with reference to FIGS. 6 to 8 in combination. Incidentally, these drawings are flowcharts showing a valve timing control routine for controlling the valve timings of the intake valve 20 and of the exhaust valve 21. This valve timing control routine is executed by, for instance, angle interruption at each predetermined crank angle by way of the electronic control unit 35.

The influence of the valve timings of the intake valve 20 and of the exhaust valve 21, i.e. the influence of the actual displacement angles INR and EXR of the intake camshaft 22 and the exhaust camshaft 23 respectively, on the state of engine operation, may come from either the valve overlap amount OVR or from the actual displacement angles INR and EXR themselves. It varies depending on the state of engine operation at the time whether the state of engine operation is influenced by the valve overlap amount OVR or by the actual displacement angles INR and EXR themselves. This factor is duly taken into consideration, and whether to perform the first or second associated process control, which prioritizes maintaining the target valve overlap amount OVP, or the discrete process control, which prioritizes prompt change of the actual displacement angles INR and EXR to the optimal value corresponding to the state of engine operation (the absolute displacement angles) is selected according to the state of engine operation.

Thus, when the engine is in a state of operation greatly influenced by the actual displacement angles INR and EXR themselves, the discrete process control is selected. Under this discrete process control, the target displacement angles INP and EXP of the intake camshaft 22 and of the exhaust camshaft 23 are computed by the discrete process control computing logic. When the engine is in a state of operation greatly influenced by the valve overlap amount OVR, the first or second associated process control is selected. Under the first associated process control, the target displacement angles INP and EXP of the intake camshaft 22 and of the exhaust camshaft 23 are computed by the first associated process control computing logic. Under the second associated process control, the target displacement angles INP and EXP the intake camshaft 22 and of the exhaust camshaft 23 are computed by the second associated process control computing logic.

Specific examples of differentiated use of the discrete process control, the first associated process control, and the second associated process control according to the state of engine operation will be described below.

A situation in which the state of engine operation is greatly influenced by the actual displacement angles INR and EXR themselves may be, for instance, one in which the engine load is heavy. Where the load on the engine is heavy, the engine 1 is required to develop a high output, and priority is given to enhancing the power output of the engine by adjusting the actual displacement angles INR and EXR themselves over improving the cleanness of exhaust by adjusting the valve overlap amount OVR. Also, since the air intake increases and the quantity of oxygen present in the combustion chamber 3 is accordingly greater at the time of combustion when the load on the engine is heavy, even if the valve overlap amount OVR (the internal EGR amount) somewhat varies, it will cause little variation in the state of combustion and will not affect engine operation. Should the first or second associated process control be performed when the engine is under heavy load, priority would be given to maintaining the target valve overlap amount OVP over promptly varying the actual displacement angles INR and EXR to the target displacement angles INP and EXP (the absolute target displacement angles), resulting in failure to achieve the required engine output but a deterioration in the performance of the engine 1.

The foregoing being taken into account, in the valve timing control routine, if it is determined that the engine load is at or above a predetermined level α, which means that the load on the engine is heavy (S101: YES in FIG. 6), the discrete process control will be executed (S102), and a prompt alteration of the actual displacement angles INR and EXR to the target displacement angles INP and EXP (the absolute target displacement angles) will be attempted. Therefore, as described above, deterioration in the performance of the engine 1 can be restrained when the engine is under heavy load. On the other hand, if it is determined at step S102 that the engine load is below the predetermined level α, the control will proceed to processing at step S103 and later steps.

Incidentally, when the valve overlap amount OVR is to be varied according to a variation in the target valve overlap amount OVP, it is conceivable to switch over the valve timing control between either the first or second associated process control and the discrete process control depending on whether the valve overlap amount OVR will become greater or smaller than it is at present. By performing such a switch-over, more preferable valve timing control can be selected according to whether the valve overlap amount OVR will become greater or smaller than it is at present.

It is conceivable, for instance, to perform either the first or second associated process control if the valve overlap amount OVR becomes smaller than it is at present and to perform the discrete process control if the valve overlap amount OVR becomes greater than it is at present. Incidentally, when either the first or second associated process control is performed, the target displacement angles INP and EXP are computed by the first or second associated process control computing logic, whichever is applicable. When the discrete process control is performed, the target displacement angles INP and EXP are computed by the discrete process control computing logic. However, when the valve timing control is switched over in this way, the valve overlap amount OVR takes a slightly smaller value than the target in a situation where the actual displacement angles INR and EXR converge on the target displacement angles INP and EXP, respectively, and the valve overlap amount OVR converges on the target valve overlap amount OVP.

On the other hand, it is also conceivable conversely to perform the discrete process control if the valve overlap amount OVR becomes smaller than it is at present and to perform either the first or second associated process control if the valve overlap amount OVR becomes greater than it is at present. However, when the valve timing control is switched over in this way, the valve overlap amount OVR takes a slightly greater value than the target in a situation where the actual displacement angles INR and EXR converge on the target displacement angles INP and EXP, respectively, and the valve overlap amount OVR converges on the target valve overlap amount OVP.

Hereupon is considered a situation in which the actual displacement angles INR and EXR converge on the target displacement angles INP and EXP, respectively, and the valve overlap amount OVR converges on the target valve overlap amount OVP under the discrete process control alone. The actual displacement angles INR and EXR then, though converging on the target displacement angles INP and EXP, are not perfectly identical with the target displacement angles INP and EXP as shown in FIG. 3(a) and FIG. 3(b), but are slightly fluctuating, repeating alternate approaches and departures to and from the target displacement angles INP and EXP. Further, when the actual displacement angles INR and EXR fluctuate as stated above, the valve overlap amount OVR also repeats alternate approaches to and departures from the target valve overlap amount OVP along with that as shown in FIG. 3(c).

If, in such a situation, the associated process control is executed only when the valve overlap amount OVR becomes either greater or smaller than it is at present, there will occur the above-described trouble that the valve overlap amount OVR becomes slightly greater or smaller than the target valve overlap amount OVP.

Thus, if the associated process control is executed only when the valve overlap amount OVR becomes smaller than it is at present, variations in the actual displacement angles INR and EXR will tend to occur more in the direction of reducing the valve overlap amount beyond the target displacement angles INP and EXP but hardly in the direction of expanding the valve overlap amount beyond the target displacement angles INP and EXP. When the actual displacement angles INR and EXR are varied in the direction of reducing the valve overlap amount beyond the target displacement angles INP and EXP, maintaining the target valve overlap amount OVP is given priority over promptly varying the actual displacement angles INR and EXR to the absolute target displacement angles. For this reason, varying the individual actual displacement angles INR and EXR in the direction of reducing the valve overlap amount beyond the target displacement angles INP and EXP tends to be permitted. Contrary to this, when the actual displacement angles INR and EXR are varied in the direction of expanding the valve overlap amount beyond the target displacement angles INP and EXP, priority is given to promptly varying those actual displacement angles INR and EXR to the target displacement angles INP and EXP. For this reason, varying the individual actual displacement angles INR and EXR in the direction of expanding the valve overlap amount beyond the target displacement angles INP and EXP tends to be prohibited.

Because of these, both actual displacement angles INR and EXR are varied in the direction of reducing the valve overlap amount even though they converge on the target displacement angles INP and EXP as shown in FIG. 4(a) and FIG. 4(b). As a result, the valve overlap amount OVR takes a slightly smaller value than the target valve overlap amount OVP as shown in FIG. 4(c). Therefore, there undeniably are a corresponding shortage of the internal EGR amount and an adverse effect on fuel economy, posing obstacles to cleaning the exhaust in terms of NOx emissions and to improving the fuel economy.

On the other hand, if the associated process control is executed only when the valve overlap amount is made larger than it is at present, variations in the actual displacement angles INR and EXR tend to occur more in the direction of increasing the valve overlap amount beyond the target displacement angles INP and EXP but hardly in the direction of reducing the valve overlap amount beyond the target displacement angles INP and EXP. When the actual displacement angles INR and EXR are varied in the direction of increasing the valve overlap amount, priority is given to maintaining the target valve overlap amount OVP over prompt change of the actual displacement angles INR and EXR to the absolute target displacement angles. For this reason, varying the individual actual displacement angles INR and EXR in the direction of expanding the actual displacement angles INR and EXR beyond the target displacement angles INP and EXP tends to be permitted. Contrary to this, when the actual displacement angles INR and EXR are varied in the direction of reducing the valve overlap amount beyond the target displacement angles INP and EXP, priority is given to promptly varying those actual displacement angles INR and EXR to the target displacement angles INP and EXP. For this reason, varying the individual actual displacement angles INR and EXR in the direction of reducing the valve overlap amount beyond the target displacement angles INP and EXP tends to be prohibited.

Because of these, both actual displacement angles INR and EXR are varied in the direction of expanding the valve overlap amount even though they converge on the target displacement angles INP and EXP, respectively, as shown in FIG. 5(a) and FIG. 5(b). As a result, the valve overlap amount OVR takes a slightly greater value than the target valve overlap amount OVP as shown in FIG. 5(c). Accordingly, there undeniably are a corresponding excess of the internal EGR amount and unstable combustion, posing obstacles to restraining the increase of HC emissions and to stabilizing the combustion.

To cope with the troubles described above, in the valve timing control routine charted in FIGS. 6 to 8, processing of steps S103 through S105 (FIG. 6) takes place. Thus, at step S103, it is judged whether or not the actual displacement angles INR and EXR converge on the target displacement angles INP and EXP, respectively, and at step S104 it is judged whether or not the valve overlap amount OVR converges on the target valve overlap amount OVP. If it is judged affirmatively at both steps S103 and S104, either the first or second associated process control will be executed irrespective of whether the valve overlap amount OVR becomes greater or smaller than it is at present (S105).

As a result, since the associated process control is executed irrespective of whether the valve overlap amount OVR becomes greater or smaller than it is at present, a slight deviation of the valve overlap amount OVR from the target valve overlap amount OVP is restrained. It is therefore made possible to restrain such troubles due to a slight deviation of the valve overlap amount OVR from the target valve overlap amount OVP as obstacles to cleaning the exhaust in terms of NOx emissions and to improving the fuel economy or to suppressing the increase of HC emissions and to stabilizing the combustion. On the other hand, if the judgment at either step S103 or step S104 is negative, the control will advance to processing at and after step S106 (FIG. 7).

Incidentally, for the intake valve 20, advancing the valve timing means varying the valve timing in the direction of increasing the valve overlap amount, and delaying the valve timing means varying the valve timing in the direction of decreasing the valve overlap amount. On the other hand, for the exhaust valve 21, advancing the valve timing means varying the valve timing in the direction of reducing the valve overlap amount, and delaying the valve timing means varying the valve timing in the direction of increasing the valve overlap amount.

Therefore, if advancing the valve timing of the intake valve 20 and delaying the valve timing of the exhaust valve 21 take place at the same time, the actual displacement angles INR and EXR of both the intake camshaft 22 and the exhaust camshaft 23 will be varied in the direction of expanding the valve overlap amount. If delaying the valve timing of the intake valve 20 and advancing the valve timing of the exhaust valve 21 take place at the same time, both of the actual displacement angles INR and EXR will be varied in the direction of reducing the valve overlap amount. In these cases, should either the first or second associated process control is being executed, the following troubles will occur as a consequence of priority given to maintaining the target valve overlap amount OVP over prompt change of the actual displacement angles INR and EXR to the target displacement angles INP and EXP (the absolute target displacement angles).

First will be considered a case in which the actual displacement angles INR and EXR of both the intake camshaft 22 and the exhaust camshaft 23 are varied in the direction of expanding the valve overlap amount. Such a situation arises when the target valve overlap amount OVP increases, i.e. when the target displacement angles INP and EXP of both the intake camshaft 22 and the exhaust camshaft 23 are varied in the direction of expanding the valve overlap amount.

If, in this case, the first associated process control is being executed, first the actual displacement angle INR of the intake camshaft 22 will vary in the direction of expanding the valve overlap amount toward the target displacement angle INP as indicated by a broken line in FIG. 9(a).

However, this variation of the actual displacement angle INR toward the target displacement angle INP takes place only gradually. Therefore, the target displacement angle EXP of the exhaust camshaft 23, which is so computed as to maintain the target valve overlap amount OVP according to the actual displacement angle INR of the intake camshaft 22, dramatically varies in the direction of expanding the valve overlap amount as indicated by a solid line in FIG. 9(b). Then, the actual displacement angle EXR of the exhaust camshaft 23 tends to change toward this target displacement angle EXP as indicated by a broken line in FIG. 9(b). Contrary to this, the pertinent target displacement angle EXP varies in the direction of reducing the valve overlap amount as indicated by the solid line in FIG. 9(b) along with the variation of the actual displacement angle INR of the intake camshaft 22 in the direction of expanding the valve overlap amount as indicated by the broken line in FIG. 9(a). As a result, the actual displacement angle EXR of the exhaust camshaft 23 (broken line in FIG. 9(b)) varies in the direction of expanding the valve overlap amount beyond the target displacement angle EXP (solid line in FIG. 9(b)), and the target valve overlap amount OVP indicated by a solid line in FIG. 9(c) overshoots the valve overlap amount OVR indicated by a broken line in the same diagram.

If the second associated process control is executed in this case, first the actual displacement angle EXR of the exhaust camshaft 23 varies in the direction of expanding the valve overlap amount toward the target displacement angle EXP as indicated by a broken line in FIG. 10(b). However, this variation of the actual displacement angle EXR toward the target displacement angle EXP takes place only gradually. Therefore, the target displacement angle INP of the intake camshaft 22, which is so computed as to maintain the target valve overlap amount OVP according to the actual displacement angle EXR of the exhaust camshaft 23, dramatically varies in the direction of expanding the valve overlap amount as indicated by a solid line in FIG. 10(a). The actual displacement angle INR of the intake camshaft 22 tends to vary toward this target displacement angle INP as indicated by a broken line in FIG. 10(a). Contrary to this, the pertinent target displacement angle INP varies in the direction of reducing the valve overlap amount as indicated by the solid line in FIG. 10(a) along with the variation of the actual displacement angle EXR of the exhaust camshaft 23 in the direction of expanding the valve overlap amount as indicated by a broken line in FIG. 10(b). As a result, the actual displacement angle INR of the intake camshaft 22 (broken line in FIG. 10(a)) varies in the direction of expanding the valve overlap amount beyond the target displacement angle INP (solid line), and the valve overlap amount OVR indicated by the broken line overshoots the target valve overlap amount OVP indicated by a solid line in FIG. 10(c).

If the first or second associated process control is being executed when the actual displacement angles INR and EXR of both the intake camshaft 22 and the exhaust camshaft 23 vary in the direction of expanding the valve overlap amount as described above, the valve overlap amount OVR will overshoot the target valve overlap amount OVP. As a consequence, the convergence of the valve overlap amount OVR on the target valve overlap amount OVP is delayed, and the excess of the internal EGR amount entails an increase in HC emissions from the internal combustion engine and instability of combustion.

Then will be considered a case in which the actual displacement angles INR and EXR of both the intake camshaft 22 and the exhaust camshaft 23 vary in the direction of reducing the valve overlap amount.

Such a situation occurs when the target valve overlap amount OVP decreases, i.e. when the target displacement angles INP and EXP of both the intake camshaft 22 and the exhaust camshaft 23 vary in the direction of reducing the valve overlap amount.

If, in this case, the first associated process control is being executed, first the actual displacement angle INR of the intake camshaft 22 varies in the direction of reducing the valve overlap amount toward the target displacement angle INP as indicated by a broken line in FIG. 11(a). However, this variation of the actual displacement angle INR toward the target displacement angle INP takes place only gradually. Therefore, the target displacement angle EXP of the exhaust camshaft 23, which is so computed as to maintain the target valve overlap amount OVP according to the actual displacement angle INR of the intake camshaft 22, dramatically varies in the direction of reducing the valve overlap amount as indicated by a solid line in FIG. 11(b). The actual displacement angle EXR of the exhaust camshaft 23 tends to vary toward this target displacement angle EXP as indicated by a broken line in FIG. 11(b). Contrary to this, the pertinent target displacement angle EXP varies in the direction of expanding the valve overlap amount as indicated by a solid line in FIG. 11(b) along with a variation of the actual displacement angle INR of the intake camshaft 22 in the direction of reducing the valve overlap amount as indicated by the broken line in FIG. 11(a). As a result, the actual displacement angle EXR of the exhaust camshaft 23 (broken line in FIG. 11(b)) varies in the direction of reducing the valve overlap amount beyond the target displacement angle EXP (solid line), and the valve overlap amount OVR indicated by a broken line undershoots the target valve overlap amount OVP indicated by a solid line in FIG. 11(c).

If, in this case, the second associated process control is being executed, first the actual displacement angle EXR of the exhaust camshaft 23 varies in the direction of reducing the valve overlap amount toward the target displacement angle EXP as indicated by a broken line in FIG. 12(b). However, this variation of the actual displacement angle EXR toward the target displacement angle EXP takes place only gradually. Therefore, the target displacement angle INP of the intake camshaft 22, which is so computed as to maintain the target valve overlap amount OVP according to the actual displacement angle EXR of the exhaust camshaft 23, dramatically varies in the direction of reducing the valve overlap amount as indicated by a solid line in FIG. 12(a). The actual displacement angle INR of the intake camshaft 22 tends to vary toward this target displacement angle INP as indicated by a broken line in FIG. 12(a). Contrary to this, the pertinent target displacement angle INP varies in the direction of expanding the valve overlap amount as indicated by the solid line in FIG. 12(a) along with the variation of the actual displacement angle EXR of the exhaust camshaft 23 in the direction of reducing the valve overlap amount as indicated by the broken line in FIG. 12(b). As a result, the actual displacement angle INR of the intake camshaft 22 (broken line in FIG. 12(a)) in the direction of reducing the valve overlap amount beyond the target displacement angle INP (solid line), and the valve overlap amount OVR indicated by a broken line undershoots the target valve overlap amount OVP indicated by a solid line in FIG. 12(c).

If the first or second associated process control is being executed when the actual displacement angles INR and EXR of both the intake camshaft 22 and the exhaust camshaft 23 vary in the direction of reducing the valve overlap amount as described above, the valve overlap amount OVR will undershoot the target valve overlap amount OVP. As a consequence, the convergence of the valve overlap amount OVR on the target valve overlap amount OVP is delayed, and the shortage of the internal EGR amount entails obstacles to cleaning the exhaust of the internal combustion engine in terms of NOx emissions and to improving the fuel economy.

To cope with the troubles described above, in the valve timing control routine charted in FIGS. 6 to 8, processing of steps S106 through S108 (FIG. 7) takes place.

Thus at step S106, it is judged whether or not a variation of the actual displacement angles INR and EXR of both the intake camshaft 22 and the exhaust camshaft 23 in the direction of expanding the valve overlap amount is instructed. This judgment is made according to, for instance, whether the following two conditions are met:

The balance of the subtraction of the actual displacement angle INR from the target displacement angle INP of the intake camshaft 22 (the absolute target displacement angle) is a positive value, i.e. advancing the valve timing of the intake valve 20 is instructed.

The balance of the subtraction of the actual displacement angle EXR from the target displacement angle EXP of the exhaust camshaft 23 (the absolute target displacement angle) is a positive value, i.e. delaying the valve timing of the exhaust valve 21 is instructed.

If both conditions are met, an affirmative judgment is made at step S106, and the process advances to step S108.

Then at step S107, it is judged whether or not an instruction is given to vary the actual displacement angles INR and EXR of both the intake camshaft 22 and the exhaust camshaft 23 in the direction of reducing the valve overlap amount. This judgment is made according to, for instance, whether the following two conditions are met:

The balance of the subtraction of the actual displacement angle INR from the target displacement angle INP of the intake camshaft 22 (the absolute target displacement angle) is a negative value, i.e. delaying the valve timing of the intake valve 20 is instructed.

The balance of the subtraction of the actual displacement angle EXR from the target displacement angle EXP of the exhaust camshaft 23 (the absolute target displacement angle) is a negative value, i.e. advancing the valve timing of the exhaust valve 21 is instructed.

If both conditions are met, an affirmative judgment is made at step S107, and the process advances to step S108. On the other hand, if negative judgments are made at step S106 and S107, the control will advance to processing at and after step S109 (FIG. 8).

If the process advances to step S108, the discrete process control prioritizing prompt change of the actual displacement angles INR and EXR to the target displacement angles INP and EXP (the absolute target displacement angles) will be executed. Where the discrete process control is executed, neither overshooting nor undershooting referred to above occurs irrespective of whether both the actual displacement angles INR and EXR are varied in the direction of expanding or in the direction of reducing the valve overlap amount.

Thus, when both the actual displacement angles INR and EXR are varied in the direction of expanding the valve overlap amount, the target displacement angles INP and EXP, under the discrete process control, are varied in the direction of expanding the valve overlap amount toward the optimal values corresponding to the state of engine operation (the absolute target displacement angles) as indicated by solid lines in FIG. 13(a) and FIG. 13(b). The actual displacement angles INR and EXR of the intake camshaft 22 and the exhaust camshaft 23 are individually varied in the direction of expanding the valve overlap amount toward the target displacement angles INP and EXP as indicated by broken lines in FIG. 13(a) and FIG. 13(b). As the actual displacement angles INR and EXR are thus individually varied to approach the target displacement angles INP and EXP (the absolute target displacement angles), overshooting of the target valve overlap amount OVP by the valve overlap amount OVR and any trouble that it would entail are restrained.

Where both the actual displacement angles INR and EXR are varied in the direction of reducing the valve overlap amount, the target displacement angles INP and EXP, under the discrete process control, are varied in the direction of reducing the valve overlap amount toward the optimal values corresponding to the state of engine operation (the absolute target displacement angles) as indicated by solid lines in FIG. 14(a) and FIG. 14(b). The actual displacement angles INR and EXR of the intake camshaft 22 and of the exhaust camshaft 23 are individually varied in the direction of reducing the valve overlap amount toward the target displacement angles INP and EXP as indicated by broken lines in FIG. 14(a) and FIG. 14(b). As the actual displacement angles INR and EXR are thus individually varied to approach the target displacement angles INP and EXP (the absolute target displacement angles), undershooting of the target valve overlap amount OVP by the valve overlap amount OVR and any trouble that it would entail are restrained.

Incidentally, there may be cases in which the valve timings of both the intake valve 20 and the exhaust valve 21 are advanced or delayed, resulting in a disparity between the expanding and reducing directions of the valve overlap amount.

Thus, [1] when the valve timings of both valves are advanced, the valve timing of the intake valve 20 is varied in the direction of expanding the valve overlap amount (advanced), and that of the exhaust valve 21 is varied in the direction of reducing the valve overlap amount (advanced). In this case, the target displacement angle INP of the intake camshaft 22 is varied in the direction of expanding the valve overlap amount, and the target displacement angle EXP of the exhaust camshaft 23 is varied in the direction of reducing the valve overlap amount.

Also, [2] when the valve timings of both valves are delayed, the valve timing of the intake valve 20 is varied in the direction of reducing the valve overlap amount (delayed), and that of the exhaust valve 21 is varied in the direction of expanding the valve overlap amount (delayed). In this case, the target displacement angle INP of the intake camshaft 22 is varied in the direction of reducing the valve overlap amount, and that of the target displacement angle displacement EXP of the exhaust camshaft 23 is varied in the direction of expanding the valve overlap amount.

It has been confirmed that, should the first or second associated process control is executed in this situation, the following phenomena would arise. Now will be individually described the phenomena that would occur when the first associated process control is being executed and those that would occur when the second associated process control is being executed both in situations [1] and [2] above.

In situation [1] when the first associated process control is being executed:

In this case, at the time of starting to vary the valve timing, first the target displacement angle INP of the intake camshaft 22 begins to be varied in the direction of expanding the valve overlap amount as indicated by a solid line in FIG. 15(a).

The actual displacement angle INR of the intake camshaft 22 begins to be varied in the direction of expanding the valve overlap amount toward this target displacement angle INP as indicated by a broken line in FIG. 15(a). The target displacement angle EXP of the exhaust camshaft 23, which is so computed as to maintain the target valve overlap amount OVP with respect to the pertinent actual displacement angle INR, shifts in the direction of reducing the valve overlap amount as indicated by a solid line in FIG. 15(b). The actual displacement angle EXR is varied in the direction of reducing the valve overlap amount toward this target displacement angle EXP as indicated by a broken line in FIG. 15(b).

The actual displacement angle EXR of the exhaust camshaft 23 varies in the direction of reducing the valve overlap amount in response to the variation of the actual displacement angle INR of the intake camshaft 22 in the direction of expanding the valve overlap amount. For this reason, the start of the variation of the actual displacement angle INR of the exhaust camshaft 23 is delayed by a predetermined length of time Δt1 relative to the start of the variation of the actual displacement angle EXR of the intake camshaft 22, and the valve overlap amount OVR becomes temporarily greater than the target valve overlap amount OVP correspondingly to this delay.

In situation [1] when the second associated process control is being executed:

In this case, at the time of starting to vary the valve timing, first the target displacement angle EXP of the exhaust camshaft 23 begins to be varied in the direction of reducing the valve overlap amount as indicated by a solid line in FIG. 16(b). The actual displacement angle EXR of the exhaust camshaft 23 begins to be varied in the direction of reducing the valve overlap amount as indicated by a broken line in FIG. 16(b) toward this target displacement angle EXP. The target displacement angle INP of the intake camshaft 22, which is so computed as to maintain the target valve overlap amount OVP with respect to the pertinent actual displacement angle EXR, shifts in the direction of expanding the valve overlap amount as indicated by a solid line in FIG. 16(a). The actual displacement angle INR is varied in the direction of expanding the valve overlap amount as indicated by a broken line in FIG. 16(a) toward this target displacement angle INP.

The actual displacement angle INR of the intake camshaft 22 varies in the direction of expanding the valve overlap amount in response to the variation of the actual displacement angle EXR of the exhaust camshaft 23 in the direction of reducing the valve overlap amount. For this reason, the start of the variation of the actual displacement angle INR of the intake camshaft 22 is delayed by a predetermined length of time Δt2 relative to the start of the variation of the actual displacement angle EXR of the exhaust camshaft 23, and the valve overlap amount OVR becomes temporarily smaller than the target valve overlap amount OVP correspondingly to this delay.

In situation [2] when the first associated process control is being executed:

In this case, at the time of starting to vary the valve timing, first the target displacement angle INP of the intake camshaft 22 begins to be varied in the direction of reducing the valve overlap amount as indicated by a solid line in FIG. 17(a). The actual displacement angle INR of the intake camshaft 22 begins to be varied in the direction of reducing the valve overlap amount as indicated by a broken line in FIG. 17(a) toward this target displacement angle INP. The target displacement angle EXP of the exhaust camshaft 23, which is so computed as to maintain the target valve overlap amount OVP with respect to the pertinent actual displacement angle INR, shifts in the direction of expanding the valve overlap amount as indicated by a solid line in FIG. 17(b). The actual displacement angle EXR is varied in the direction of expanding the valve overlap amount as indicated by a broken line in FIG. 17(b) toward this target displacement angle EXP.

The actual displacement angle EXR of the exhaust camshaft 23 varies in the direction of expanding the valve overlap amount in response to the variation of the actual displacement angle INR of the intake camshaft 22 in the direction of reducing the valve overlap amount. For this reason, the start of the variation of the actual displacement angle INR of the exhaust camshaft 23 is delayed by a predetermined length of time Δt3 relative to the start of the variation of the actual displacement angle EXR of the intake camshaft 22, and the valve overlap amount OVR becomes temporarily smaller than the target valve overlap amount OVP correspondingly to this delay.

In situation [2] when the second associated process control is being executed:

In this case, at the time of starting to vary the valve timing, first the target displacement angle EXP of the exhaust camshaft 23 begins to be varied in the direction of expanding the valve overlap amount as indicated by a solid line in FIG. 17(b). The actual displacement angle EXR of the exhaust camshaft 23 begins to be varied in the direction of expanding the valve overlap amount as indicated by a broken line in FIG. 17(b) toward this target displacement angle EXP. And the target displacement angle INP of the intake camshaft 22, which is so computed as to maintain the target valve overlap amount OVP with respect to the pertinent actual displacement angle EXR, shifts in the direction of reducing the valve overlap amount as indicated by a solid line in FIG. 17(a). The actual displacement angle INR is varied in the direction of reducing the valve overlap amount as indicated by a broken line in FIG. 17(a) toward this target displacement angle INP.

The actual displacement angle INR of the intake camshaft 22 varies in the direction of reducing the valve overlap amount in response to the variation of the actual displacement angle EXR of the exhaust camshaft 23 in the direction of expanding the valve overlap amount. For this reason, the start of the variation of the actual displacement angle INR of the intake camshaft 22 is delayed by a predetermined length of time Δt4 relative to the start of the variation of the actual displacement angle EXR of the exhaust camshaft 23, and the valve overlap amount OVR becomes temporarily greater than the target valve overlap amount OVP correspondingly to this delay.

Now will be considered the influences on the engine 1 of expansion and reduction of the valve overlap amount OVR beyond the target valve overlap amount OVP.

Where the valve overlap amount OVR is expanded beyond the target valve overlap amount OVP, an excessively large internal EGR amount not only increase the HC emissions of the engine 1 but also destabilizes combustion, inviting in the worst case a misfire, which would in turn induce stalling. On the other hand, when the valve overlap amount OVR is reduced below the target valve overlap amount OVP, an excessively small internal EGR amount might invite an increase in the NOx emissions of the engine 1 and deteriorated fuel economy, but the adverse influence would not be so serious as to invite stalling of the the reliability of engine performance, it is preferable to prevent the valve overlap amount OVR by all means from increasing beyond the target valve overlap amount OVP even at the risk of inviting its decrease below the target valve overlap amount OVP.

With the foregoing being taken into account, steps S109 to S114 (FIG. 8) are executed in the valve timing control routine charted in FIGS. 6 to 8.

At steps S109 and S110, it is judged whether or not the situation is as stated in [1] above.

Thus, it is first judged whether or not it is instructed to vary the actual displacement angle INR of the intake camshaft 22 in the direction of expanding the valve overlap amount (S109). The judgment here is made on the basis of, for instance, whether or not the balance of subtraction of the actual displacement angle INR from the target displacement angle INP of the intake camshaft 22 (the absolute target displacement angle) is a positive value, in other words whether or not it is instructed to advance the valve timing of the intake valve 20.

Then, it is judged whether or not it is instructed to vary the actual displacement angle EXR of the exhaust camshaft 23 in the direction of reducing the valve overlap amount (S110). The judgment here is made on the basis of, for instance, whether or not the balance of subtraction of the actual displacement angle EXR from the target displacement angle EXP of the exhaust camshaft 23 (the absolute target displacement angle) is a negative value, in other words whether or not it is instructed to advance the valve timing of the exhaust valve 21.

If the judgments at both steps S109 and S110 are affirmative, it will be determined that the situation is as stated in [1] above, and the second associated process control will be executed (S111). In this case, since the second associated process control is executed in the situation described in [1] above, it is made possible to prevent in situation [1] the valve overlap amount OVR from surpassing the target valve overlap amount OVP, and the adverse effect on engine operation it would entail. On the other hand, if the judgment at any of steps S109 and S110 is negative, the control will advance to processing at and after step S112.

At steps S112 and S113, it is judged whether or not the situation is as stated in [2] above.

Thus, it is first judged whether or not it is instructed to vary the actual displacement angle INR of the intake camshaft 22 in the direction of reducing the valve overlap amount (S112). The judgment here is made on the basis of, for instance, whether or not the balance of subtraction of the actual displacement angle INR from the target displacement angle INP of the intake camshaft 22 (the absolute target displacement angle) is a negative value, in other words whether or not delaying the valve timing of the intake valve 20 is instructed.

Then, it is judged whether or not it is instructed to vary the actual displacement angle EXR of the exhaust camshaft 23 in the direction of expanding the valve overlap amount (S113). The judgment here is made on the basis of, for instance, whether or not the balance of subtraction of the actual displacement angle EXR from the actual displacement angle EXR of the exhaust camshaft 23 (the absolute target displacement angle) is a positive value, in other words whether or not delaying the valve timing of the exhaust valve 21 is instructed.

If the judgments at both steps S112 and S113 are affirmative, it will be determined that the situation is as stated in [2] above, and the first associated process control (S114) will be executed. In this case, since the first associated process control is executed in the situation described in [2] above, it is made possible to prevent in situation [2] the valve overlap amount OVR from surpassing the target valve overlap amount OVP and the adverse effect on engine operation it would entail.

The embodiment according to the present invention described in detail above provides the following advantages.

(1) Under the first or second associated process control, the displacement angles of the intake camshaft 22 and of the exhaust camshaft 23 can be varied while maintaining the target valve overlap amount OVP. Also, even if a difference in response speed occurs in varying the displacement angles of the intake camshaft 22 and the exhaust camshaft 23, any variation of the valve overlap amount OVR away from the target valve overlap amount OVP due to that difference in response speed can be kept to the minimum. Therefore, execution of either of these associated process controls can prevent, when varying the displacement angles of the intake camshaft 22 and of the exhaust camshaft 23, deviation of the valve overlap amount OVR from the target valve overlap amount OVP to adversely affect the state of engine operation, making it possible to keep the state of engine operation satisfactory.

(2) When the actual displacement angles INR and EXR affect the state of engine operation, either the valve overlap amount OVR may affect the state of engine operation or the actual displacement angles INR and EXR themselves may affect the state of engine operation. Whether the valve overlap amount OVR affects the state of engine operation or the actual displacement angles INR and EXR themselves affect the state of engine operation depends on the state of engine operation at the time. If, for instance, the first or second associated process control giving priority to maintaining the target valve overlap amount OVP is executed when the engine is under heavy load, the required engine output cannot be achieved and the performance of the engine 1 will drop. However, when the engine load is not less than the predetermined level $\alpha$, the discrete process control giving priority to prompt change of the actual displacement angles INR and EXR to the target displacement angles INP and EXP (the absolute target displacement angles) will take place, and accordingly the performance drop of the engine 1 referred to above can be restrained.

(3) If the valve timing control differs between the discrete process control and either associated process control depending on whether the valve overlap amount OVR is varied above or below it is at present, there may arise troubles in some state of engine operation. Any such trouble may arise, for instance, when the actual displacement angles INR and EXR converge on the target displacement angles INP and EXP and the valve overlap amount OVR converges on the target valve overlap amount OVP. In this case, the valve overlap amount OVR may take a value slightly greater or smaller than the target valve overlap amount OVP, and this would adversely affect engine operation. However, in such a situation, irrespective of whether the valve overlap amount OVR becomes greater or smaller than it is at present, either the first or second associated process control is executed. Therefore, it is possible to restrain the aforementioned slight deviation of the valve overlap amount OVR from the target valve overlap amount OVP, and to prevent the deviation from adversely affecting the state of engine operation.

(4) When the target displacement angles INP and EXP (the actual displacement angles INR and EXR) of both the intake camshaft 22 and the exhaust camshaft 23 are varied in the direction of expanding or reducing the valve overlap amount, troubles will occur if the first or second associated process control is being executed. Thus, when they are varied in the direction of expanding the valve overlap amount, the valve overlap amount OVR overshoots the target valve overlap amount OVP. When they are varied in the direction of reducing the valve overlap amount, the valve overlap amount OVR undershoots the target valve overlap amount OVP. However, as the discrete process control is executed in such a situation and the occurrence of overshooting or undershooting is thereby restrained, any trouble that would arise can be suppressed.

(5) When the target displacement angles INP and EXP (the actual displacement angles INR and EXR) of the intake camshaft 22 and the exhaust camshaft 23 are varied differently in direction between expanding and reducing the valve overlap amount, the adverse effect on engine operation may be serious depending on the way of executing the first or second associated process control.

For instance, when the valve timings of both the intake valve 20 and of the exhaust valve 21 are advanced, the displacement angle of the intake camshaft 22 is varied in the direction of expanding the valve overlap amount, and the displacement angle of the exhaust camshaft 23 is varied in the direction of reducing the valve overlap amount. If, for instance, the first associated process control is being executed then, the valve overlap amount OVR will become greater than the target valve overlap amount OVP, resulting in a serious adverse effect on engine operation. However, since the second associated process control is executed in such a situation and the adverse effect on engine operation as stated above will be restrained, the risk of a worst situation, such as engine stalling, is minimized to enhance the reliability of engine operation.

Where the valve timings of both the intake valve 20 and the exhaust valve 21 are delayed, the displacement angle of the intake camshaft 22 is varied in the direction of reducing the valve overlap amount and the displacement angle of the exhaust camshaft 23 is varied in the direction of expanding the valve overlap amount. If, for instance, the second associated process control is executed then, the valve overlap amount OVR will become greater than the target valve overlap amount OVP, resulting in a serious adverse effect on engine operation. However, since the first associated process control is executed in such a situation and the adverse effect on engine operation as stated above will be restrained, the risk of a worst situation, such as engine stalling, is minimized to enhance the reliability of engine operation.

To add, the embodiments according to the invention described above may be modified as described below, for instance.

Whereas the predetermined level $\alpha$, against which the relative level of the engine load is assessed, may be any value, it is preferable to use a value representing a heavy load on the engine.

In determining the target displacement angle EXP of the exhaust camshaft 23 as the optimal value corresponding to the state of engine operation (the absolute target displacement angle), it is computed by referencing a map on the basis of the engine speed and the engine load. Then, in determining the target displacement angle INP of the intake camshaft 22 as the optimal value corresponding to the state of engine operation (the absolute target displacement angle), it may as well be computed by using Equation (5) below.

$$INP = OVP - (EXP + OV0) \quad (5)$$

INP: Target displacement angle of the intake camshaft
EXP: Target displacement angle of the exhaust camshaft
OVP: Target valve overlap
OV0: Initial value of the valve overlap amount This Equation (5) is obtained by modifying the above-cited Equation (1) of the relationship between the displacement angle and the valve overlap amount by replacing the valve overlap amount OVR with the target valve overlap amount OVP, and the actual displacement angle EXR of the exhaust camshaft 23 with the target displacement angle EXP.

The above-described method of figuring out the target displacement angle EXP of the exhaust camshaft 23 from a map and computing the target displacement angle INP of the intake camshaft 22 by an equation may be applied not only to the discrete process control, by which the target displacement angles INP and EXP are computed as the absolute target displacement angle, but also to the first and second associated process controls.

Although the displacement angles are used above as values representing the valve timings of the intake valve 20 and of the exhaust valve 21, some other parameters representing the valve timings of the valves 20 and 21 may be used instead.

While the invention is applied to the engine 1 whose valve timings are variable as operational actuation of the intake valve 20 and of the exhaust valve 21, it is also applicable to an engine provided with variable valve lift mechanisms on the intake and exhaust sides to enable the shifting trends, as operational actuation, of the intake valve 20 and the exhaust valve 21. In this case, the driving of the variable valve lift mechanisms on the intake and exhaust sides is controlled to regulate the valve overlap amount.

While the invention is applied to the engine 1 of the spark ignition type, it may as well be applied to engines of some other type which are provided with variable valve actuation mechanisms for both intake valves and exhaust valves to vary their actuation, such as diesel engines.

What is claimed is:

1. An apparatus for controlling valve actuation in an internal combustion engine having intake and exhaust valves, wherein the apparatus controls valve actuation of the intake valve and valve actuation of the exhaust valve each to be a corresponding predetermined target valve actuation, the apparatus comprising:

first computation section, wherein, according to an operation state of the engine, the first computation section computes the target valve actuation of a first valve and a target valve overlap amount of the valves, the first valve being one of the intake valve and the exhaust valve, and wherein, based on the computed target valve overlap amount and an actual valve actuation of the first valve, the first computation section computes the target valve actuation of a second valve, the second valve being the other one of the intake valve and the exhaust valve;

second computation section, wherein, according to the operation state of the engine, the second computation section computes the target valve actuation of the intake valve and the target valve actuation of the exhaust valve; and selecting section that selects, as the target valve actuation of the intake valve and the target valve actuation of the exhaust valve, one of the computation result of the first computation section and the computation result of the second computation section according to the operation state of the engine, and wherein the selecting section selects the computation result of the second computation section when load on the engine is no less than a predetermined value.

2. An apparatus for controlling valve actuation in an internal combustion engine having intake and exhaust valves, wherein the apparatus controls valve actuation of the intake valve and valve actuation of the exhaust valve each to be a corresponding predetermined target valve actuation, the apparatus comprising:

first computation section, wherein, according to an operation state of the engine, the first computation section computes the target valve actuation of a first valve and a target valve overlap amount of the valves, the first valve being one of the intake valve and the exhaust valve, and wherein, based on the computed target valve overlap amount and an actual valve actuation of the first valve, the first computation section computes the target valve actuation of a second valve, the second valve being the other one of the intake valve and the exhaust valve;

second computation section, wherein, according to the operation state of the engine, the second computation section computes the target valve actuation of the intake valve and the target valve actuation of the exhaust valve; and selecting section that selects, as the target valve actuation of the intake valve and the target valve actuation of the exhaust valve, one of the computation result of the first computation section and the computation result of the second computation section according to the operation state of the engine, and wherein the selecting means section selects the computation result of the first computation section when the valve actuation of the intake valve and the valve actuation of the exhaust valve each have converged on the corresponding target valve actuation and the valve overlap amount of the valves has converged on the target valve overlap amount.

3. The apparatus according to claim 2, wherein the selecting section selects the computation result of different computation section in a case where the valve overlap amount is made smaller than it is at present and in a case where the valve overlap amount is made greater than it is at present, and wherein, when the valve actuation of the intake valve and the valve actuation of the exhaust valve each have converged on the corresponding target valve actuation and the valve overlap amount of the valves has converged on the target valve overlap amount, the selecting section selects the computation result of the first computation means section irrespective of whether the valve overlap amount is made smaller or greater than it is at present.

4. An apparatus for controlling valve actuation in an internal combustion engine having intake and exhaust valves, wherein the apparatus controls valve actuation of the intake valve and valve actuation of the exhaust valve each to be a corresponding predetermined target valve actuation, the apparatus comprising:

first computation section, wherein, according to an operation state of the engine, the first computation section computes the target valve actuation of a first valve and a target valve overlap amount of the valves, the first valve being one of the intake valve and the exhaust valve, and wherein, based on the computed target valve overlap amount and an actual valve actuation of the first valve, the first computation section computes the target valve actuation of a second valve, the second valve being the other one of the intake valve and the exhaust valve;

second computation section, wherein, according to the operation state of the engine, the second computation section computes the target valve actuation of the intake valve and the target valve actuation of the exhaust valve; and selecting section that selects, as the target valve actuation of the intake valve and the target valve actuation of the exhaust valve, one of the computation result of the first computation section and the computation result of the second computation section according to the operation state of the engine, and wherein the selecting section selects the computation result of the second computation section when the valve actuation of the intake valve and the valve actuation of the exhaust valve are both changed to increase or reduce the valve overlap amount.

5. An apparatus for controlling valve actuation in an internal combustion engine having intake and exhaust valves, wherein the apparatus controls valve actuation of the intake valve and valve actuation of the exhaust valve each to be a corresponding predetermined target valve actuation, the apparatus comprising:

primary process control section, wherein the primary process control section computes the target valve actuation of a first valve according to an operation state of the engine, the first valve being one of the intake valve and the exhaust valve, and the primary process control section controls the valve actuation of the first valve to be the computed valve actuation; and secondary process control section, wherein the secondary process control section computes the target valve actuation of a second valve based on a target valve overlap amount of the valves, which overlap amount is computed according to the operation state of the engine, and an actual valve actuation of the first valve, the second valve being the other one of the intake valve and the exhaust valve, and the secondary process control section controls the valve actuation of the second valve to be the computed valve actuation, wherein, when one of the valve actuation of the intake valve and the valve actuation of the exhaust valve is changed to increase the valve overlap amount and the other valve actuation is changed to reduce the valve overlap amount, the primary process control section and the secondary process control section execute the valve actuation control by setting the valve that is related to the reduction of the valve overlap amount as the first valve and setting the valve that is related to the increase of the valve overlap amount as the second valve.

6. The apparatus according to claim 5, further comprising:

discrete process control section, wherein the discrete process control section computes the target valve actuation of the intake valve and the target valve actuation of the exhaust valve according to the operation state of the engine, and the discrete process control means section controls the valve actuation of each valve to be the corresponding target valve actuation, and wherein the valve actuation control by the primary process control section and the secondary process control section, and the valve actuation control by the discrete process control section are selectively executed according to the operation state of the engine.

7. An apparatus for controlling valve actuation in an internal combustion engine having intake and exhaust valves, wherein the apparatus controls valve timing of the intake valve and valve timing of the exhaust valve each to be a corresponding predetermined target valve timing, the apparatus comprising:

primary process control section, wherein the primary process control section computes the target valve timing of a first valve according to an operation state of the engine, the first valve being one of the intake valve and the exhaust valve, and the primary process control section controls the valve timing of the first valve to be the computed valve timing; and secondary process control section, wherein the secondary process control section computes the target valve timing of a second valve based on a target valve overlap amount of the valves, which overlap amount is computed according to the operation state of the engine, and an actual valve timing of the first valve, the second valve being the other one of the intake valve and the exhaust valve, and the secondary process control section controls the valve timing of the second valve to be the computed valve timing, wherein, when the valve timing of the intake valve and the valve timing of the exhaust valve are both being advanced, the primary process control section and the secondary process control section execute the valve timing control by setting the exhaust valve as the first valve and setting the intake valve as the second valve, wherein, when the valve timing of the intake valve and the valve timing of the exhaust valve are both being delayed, the primary process control section and the secondary process control section execute the valve timing control by setting the intake vale as the first valve and setting the exhaust valve as the second valve.

* * * * *

UNITED STATES PATENT AND TRADEMARK OFFICE
CERTIFICATE OF CORRECTION

PATENT NO. : 7,011,054 B2 Page 1 of 1
APPLICATION NO. : 10/525872
DATED : March 14, 2006
INVENTOR(S) : Hirowatari et al.

It is certified that error appears in the above-identified patent and that said Letters Patent is hereby corrected as shown below:

| Column | Line | |
|---|---|---|
| 6 | 54 | Change "vale" to -- valve --; |
| 24 | 65 | Change "the the" to -- the engine 1. For this reason, from the viewpoint of enhancing the --; and |
| 32 | 13 | Change "vale" to -- valve --. |

Signed and Sealed this

Sixth Day of March, 2007

JON W. DUDAS
*Director of the United States Patent and Trademark Office*